(12) United States Patent
Perevozchikov et al.

(10) Patent No.: US 12,516,678 B2
(45) Date of Patent: Jan. 6, 2026

(54) VARIABLE INLET GUIDE VANE APPARATUS COMBINED WITH COMPRESSOR END CAP

(71) Applicant: Copeland LP, Sidney, OH (US)

(72) Inventors: Michael M. Perevozchikov, Tipp City, OH (US); Patrick Shawn O'Meara, Tipp City, OH (US)

(73) Assignee: Copeland LP, Sidney, OH (US)

( * ) Notice: Subject to any disclaimer, the term of this patent is extended or adjusted under 35 U.S.C. 154(b) by 0 days.

(21) Appl. No.: 18/186,273

(22) Filed: Mar. 20, 2023

(65) Prior Publication Data
US 2024/0318659 A1   Sep. 26, 2024

(51) Int. Cl.
*F04D 29/46* (2006.01)
*F04D 27/02* (2006.01)
(Continued)

(52) U.S. Cl.
CPC ....... *F04D 29/462* (2013.01); *F04D 27/0246* (2013.01); *F04D 29/05* (2013.01); *F04D 29/063* (2013.01); *F04D 29/245* (2013.01); *F04D 29/284* (2013.01); *F04D 29/4213* (2013.01); *F04D 29/601* (2013.01);
(Continued)

(58) Field of Classification Search
CPC .... F04D 29/245; F04D 27/0246; F04D 29/05; F04D 29/063; F04D 29/284; F04D 29/601; F04D 29/462; F04D 29/4213; F05D 2250/51; F05D 2240/12; F05D 2260/4031; F01D 17/162
See application file for complete search history.

(56) References Cited

U.S. PATENT DOCUMENTS

| | | |
|---|---|---|
| 2,083,186 A | 6/1937 | Anderson |
| 2,733,853 A | 2/1956 | Trumpler |

(Continued)

FOREIGN PATENT DOCUMENTS

| | | | | |
|---|---|---|---|---|
| CN | 201090533 Y | * | 7/2008 | ......... F04D 29/4213 |
| CN | 201265558 Y | * | 7/2009 | ......... F04D 29/4213 |

(Continued)

OTHER PUBLICATIONS

CN-104564833-A, English language machine translation (Year: 2015).*
CN 102478026, English Language Machine Translation (Year: 2012).*

*Primary Examiner* — Wesley G Harris
(74) *Attorney, Agent, or Firm* — Armstrong Teasdale LLP

(57) ABSTRACT

An inlet guide vane apparatus includes a compressor end cap connectable with a main body of a compressor housing and a housing portion connected to the end cap. The housing portion and the end cap cooperatively define a fluid flow passageway and guide vane openings extending into the fluid flow passageway. The inlet guide vane apparatus also includes a ring gear rotatable relative to at least one of the housing portion and the end cap and guide vanes connected to the housing portion and the end cap. Each guide vane extends through one of the guide vane openings and includes a vane gear operably connectable with the ring gear and disposed at an exterior of the housing portion and a vane disposed within the fluid flow passageway. Each guide vane is rotatable such that an orientation of the vane within the fluid flow passageway is selectively adjustable.

19 Claims, 23 Drawing Sheets

(51) Int. Cl.
  *F04D 29/05* (2006.01)
  *F04D 29/063* (2006.01)
  *F04D 29/24* (2006.01)
  *F04D 29/28* (2006.01)
  *F04D 29/42* (2006.01)
  *F04D 29/60* (2006.01)

(52) U.S. Cl.
  CPC ...... *F05D 2210/12* (2013.01); *F05D 2230/60* (2013.01); *F05D 2250/51* (2013.01); *F05D 2260/4031* (2013.01); *F05D 2300/509* (2013.01)

(56) References Cited

U.S. PATENT DOCUMENTS

| | | | |
|---|---|---|---|
| 3,243,159 | A | 3/1966 | Hefler et al. |
| 4,150,915 | A | 4/1979 | Karstensen |
| 4,239,450 | A * | 12/1980 | Geitner ............... F04D 29/46 415/160 |
| 4,514,141 | A * | 4/1985 | Marey ............... F01D 17/162 415/160 |
| 4,725,196 | A | 2/1988 | Kaneki et al. |
| 6,039,534 | A * | 3/2000 | Stoner ............... F01D 17/162 415/150 |
| 6,860,725 | B2 | 3/2005 | Park et al. |
| 6,994,518 | B2 | 2/2006 | Simon et al. |
| 7,181,928 | B2 | 2/2007 | de Larminat |
| 7,439,702 | B2 | 10/2008 | Smith et al. |
| 8,079,808 | B2 | 12/2011 | Sconfietti |
| 8,156,757 | B2 | 4/2012 | Doty et al. |
| 9,200,640 | B2 | 12/2015 | Patili |
| 10,227,931 | B2 | 3/2019 | Stockwell |
| 10,233,941 | B2 | 3/2019 | Shihming et al. |
| 10,240,612 | B2 | 3/2019 | Yang et al. |
| 10,364,826 | B2 | 7/2019 | Sishtla |
| 10,458,430 | B2 | 10/2019 | Nakaniwa et al. |
| 10,544,791 | B2 | 1/2020 | De |
| 10,711,797 | B2 | 7/2020 | Kroger et al. |
| 2007/0154302 | A1 | 7/2007 | Sconfietti |
| 2010/0068049 | A1 | 3/2010 | Thermos et al. |
| 2010/0329898 | A1 | 12/2010 | Dunn et al. |
| 2012/0121403 | A1 | 5/2012 | Clemons et al. |
| 2012/0134784 | A1 | 5/2012 | Yen et al. |
| 2012/0171020 | A1 | 7/2012 | Peck et al. |
| 2013/0330177 | A1 | 12/2013 | Silveira et al. |
| 2015/0125274 | A1* | 5/2015 | Liang ............... F04D 29/4213 415/157 |
| 2015/0322965 | A1 | 11/2015 | Hasegawa et al. |
| 2015/0330404 | A1 | 11/2015 | Sarri et al. |
| 2016/0281736 | A1* | 9/2016 | Wiederien ............ F04D 29/462 |
| 2017/0114731 | A1 | 4/2017 | Ichi et al. |
| 2017/0167501 | A1 | 6/2017 | Saito et al. |
| 2019/0178255 | A1 | 6/2019 | Leighty et al. |
| 2019/0285072 | A1 | 9/2019 | Masutani et al. |
| 2020/0120881 | A1 | 4/2020 | Hall et al. |
| 2022/0145771 | A1 | 5/2022 | Poick et al. |
| 2022/0186631 | A1 | 6/2022 | Yamazaki et al. |

FOREIGN PATENT DOCUMENTS

| | | | | |
|---|---|---|---|---|
| CN | 102478026 | A * | 5/2012 | ........ F04D 29/4213 |
| CN | 202690536 | U | 1/2013 | |
| CN | 104564833 | A * | 4/2015 | |
| DE | 29917625 | U1 * | 3/2000 | ............ F01D 11/122 |
| DE | 102019201039 | A1 | 7/2020 | |
| DE | 102020129121 | B3 | 3/2022 | |
| EP | 3499043 | A1 | 6/2019 | |
| GB | 2168432 | A | 12/1984 | |
| JP | 2012246767 | A | 12/2012 | |
| WO | 2008045413 | A2 | 4/2008 | |
| WO | WO-2011056167 | A1 * | 5/2011 | ........ F04D 27/0246 |
| WO | 2012161283 | A1 | 11/2012 | |
| WO | 2014067455 | A1 | 5/2014 | |
| WO | WO-2014077310 | A1 * | 5/2014 | ........... F04D 17/122 |
| WO | WO-2015031058 | A1 * | 3/2015 | ............ F01D 17/14 |

* cited by examiner

VARIABLE INLET GUIDE VANE APPARATUS COMBINED WITH COMPRESSOR END CAP

FIELD OF THE DISCLOSURE

The field of the disclosure relates generally to compressors, and more particularly, to a variable inlet guide vane apparatus combined with an end cap of a compressor.

BACKGROUND

Inlet guide vane devices can be used to regulate pressure and direction of fluid flow at the inlet of a compressor, such as a centrifugal compressor. Conventional inlet guide vane devices include guide vanes arranged circumferentially about a fluid flow path. The vanes impart a swirling motion to the fluid flow directing the fluid flow at suitable angles entering the compressor to improve efficiency and performance. The guide vanes may be rotated to adjust the orientation of the guide vanes relative to the fluid flow path to meet air intake requirements of the compressor for various operating conditions.

Each of the guide vanes may be rotatable relative to a housing mounted in proximity to the inlet of the compressor. High wear components of known inlet guide vane devices may be difficult to access for inspection and/or maintenance. Known inlet guide vane devices have one or more bearings which require maintenance, such as relubrication and/or periodic replacement, requiring downtime of the compressor. In some instances, the guide vane housing must be disconnected from the compressor, and then the guide vane housing disassembled during repair or inspection to access the guide vanes. The disassembly process can result in significant downtime of the compressor. Additionally, disassembly of the housing to access the guide vanes increases the likelihood of handling and installation damage, reducing the overall life of the inlet guide vane device. For example, disassembly of the housing may expose bearing surfaces to contaminates and debris potentially leading to etching and corrosion. Reassembling of the guide vanes relative to the housing may also result in misalignment.

This section is intended to introduce the reader to various aspects of art that may be related to various aspects of the disclosure, which are described and/or claimed below: This discussion is believed to be helpful in providing the reader with background information to facilitate a better understanding of the various aspects of the present disclosure. Accordingly, these statements are to be read in this light, and not as admissions of prior art.

SUMMARY

In one aspect, an inlet guide vane apparatus for use in combination with a compressor housing is provided. The inlet guide vane apparatus is configured to impart a pre-swirl motion to a fluid flow entering an inlet of the compressor housing. The inlet guide vane apparatus includes a compressor end cap connectable with a main body of the compressor housing to define the inlet of the compressor housing and a housing portion connected to the end cap. The housing portion and the end cap cooperatively define a fluid flow passageway and guide vane openings extending into the fluid flow passageway. The inlet guide vane apparatus also includes a ring gear rotatable relative to at least one of the housing portion and the end cap. The inlet guide vane apparatus also includes guide vanes connected to the housing portion and the end cap. Each guide vane extends through one of the guide vane openings. Each guide vane includes a vane gear operably connectable with the ring gear and disposed at an exterior of the housing portion. Each guide vane also includes a vane disposed within the fluid flow passageway. Each of the guide vanes is rotatable relative to the housing portion and the end cap such that an orientation of the vane within the fluid flow passageway is selectively adjustable.

In another aspect, a compressor is provided. The compressor includes a compressor housing and a driveshaft rotatably supported within the compressor housing. The compressor housing includes a main body and an end cap connected to an end of the main body. The end cap defines an inlet of the compressor housing. The compressor also includes an impeller connected to the driveshaft and operable to impart kinetic energy to a fluid flow entering the inlet upon rotation of the driveshaft. The compressor also includes an inlet guide vane apparatus combined with the end cap of the compressor housing. The inlet guide vane apparatus includes a housing portion connected to and positioned axially downstream from the end cap. The end cap and the housing portion cooperatively define a fluid flow passageway and guide vane openings extending into the fluid flow passageway. The inlet guide vane apparatus also includes a ring gear rotatable relative to at least one of the housing portion and the end cap and guide vanes connected to the housing portion and the end cap. Each guide vane extends through one of the guide vane openings. Each guide vane includes a vane gear operably connected to the ring gear and disposed at an exterior of the housing portion. Each guide vane also includes a vane disposed within the fluid flow passageway. Each of the guide vanes is rotatable relative to the housing portion such that an orientation of the vane within the fluid flow passageway is selectively adjustable.

In another aspect, a method of assembling a compressor is provided. The compressor includes a compressor housing having a main body and an end cap connected to an end of the main body, and an inlet guide vane apparatus combined with the end cap. The inlet guide vane apparatus includes a housing portion and guide vanes. Each guide vane includes a vane gear and a vane. The method includes assembling the inlet guide vane apparatus by rotatably connecting a ring gear to one of the housing portion and the end cap, connecting the housing portion to the end cap such that the housing portion and the end cap cooperatively define a fluid flow passageway and guide vane openings extending into the fluid flow passageway, positioning the guide vanes relative to the other one of the housing portion and the end cap such that, when the housing portion and the end cap are connected, each guide vane extends through one of the guide vane openings and the vane of each vane gear is disposed in the fluid flow passageway, and operably connecting the vane gear of each guide vane to the ring gear. The method also includes positioning the inlet guide vane apparatus within the main body of the compressor housing and connecting the end cap to an end of the main body to define an inlet of the compressor housing that is fluidly connected with the fluid flow passageway.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
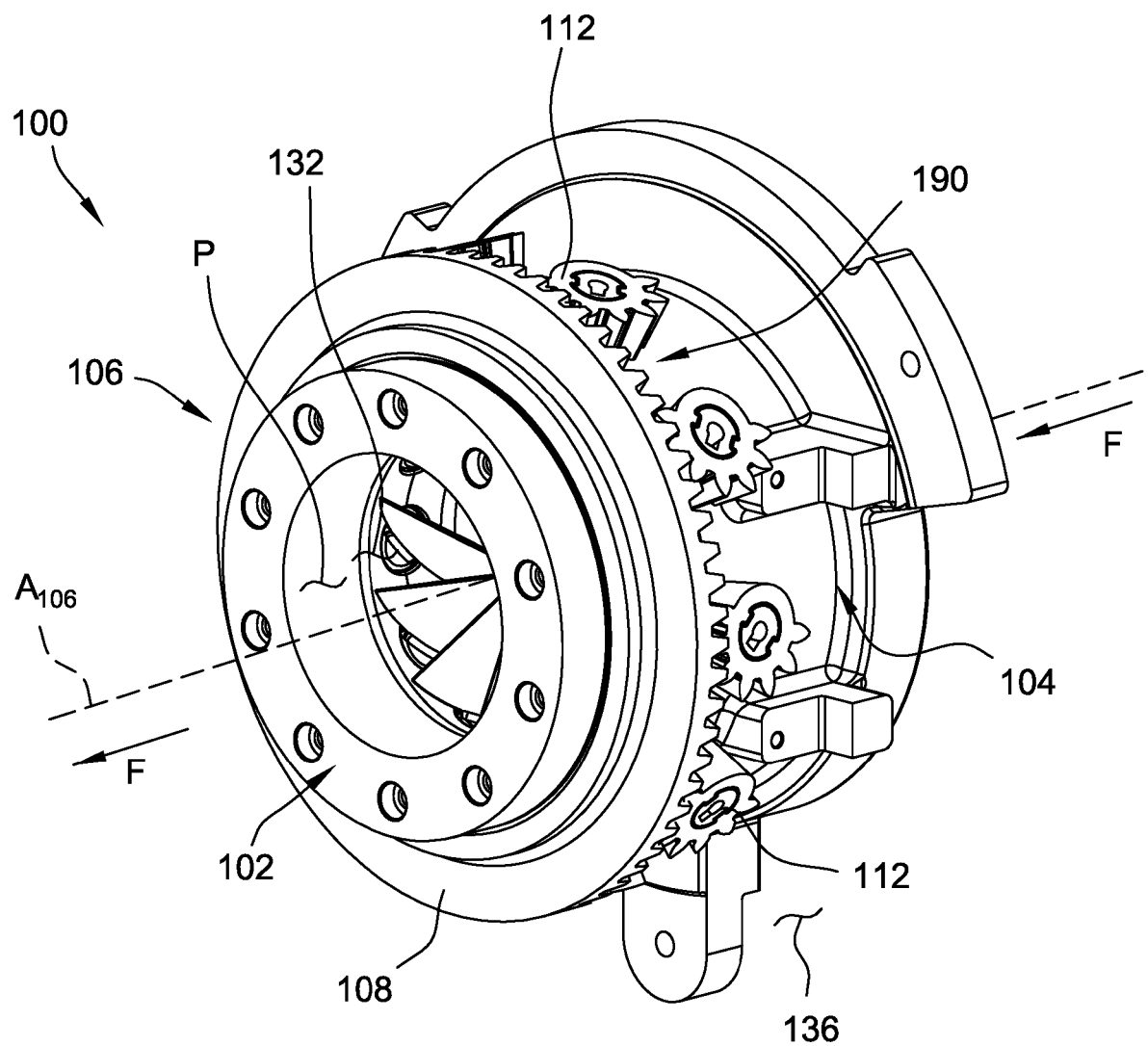
FIG. 1 is a perspective view of an example variable inlet guide vane apparatus including a first and second housing portion, a bearing, a ring gear, and guide vanes.

FIG. 1 is a perspective view of an example variable inlet guide vane apparatus, generally indicated at 100. The variable inlet guide vane apparatus 100 (also referred to herein as the inlet guide 100) is suitable for use with compressors, such as centrifugal compressors (see, e.g., compressor 300, shown in FIGS. 19 and 20), and can improve the operating range and efficiency of the compressor by imparting a pre-swirl motion to a fluid flow F entering the compressor. The inlet guide 100 may be mounted in proximity to an inlet of the compressor and the fluid flow F exits the inlet guide 100 with a pre-swirl and enters the inlet of the compressor, such that the fluid flow F contacts an impeller of the compressor with a suitable direction. Alternatively, and/or additionally, the inlet guide vane 100 is mounted in proximity to the inlet for each stage of a multi-stage compressor.

Figure 2:
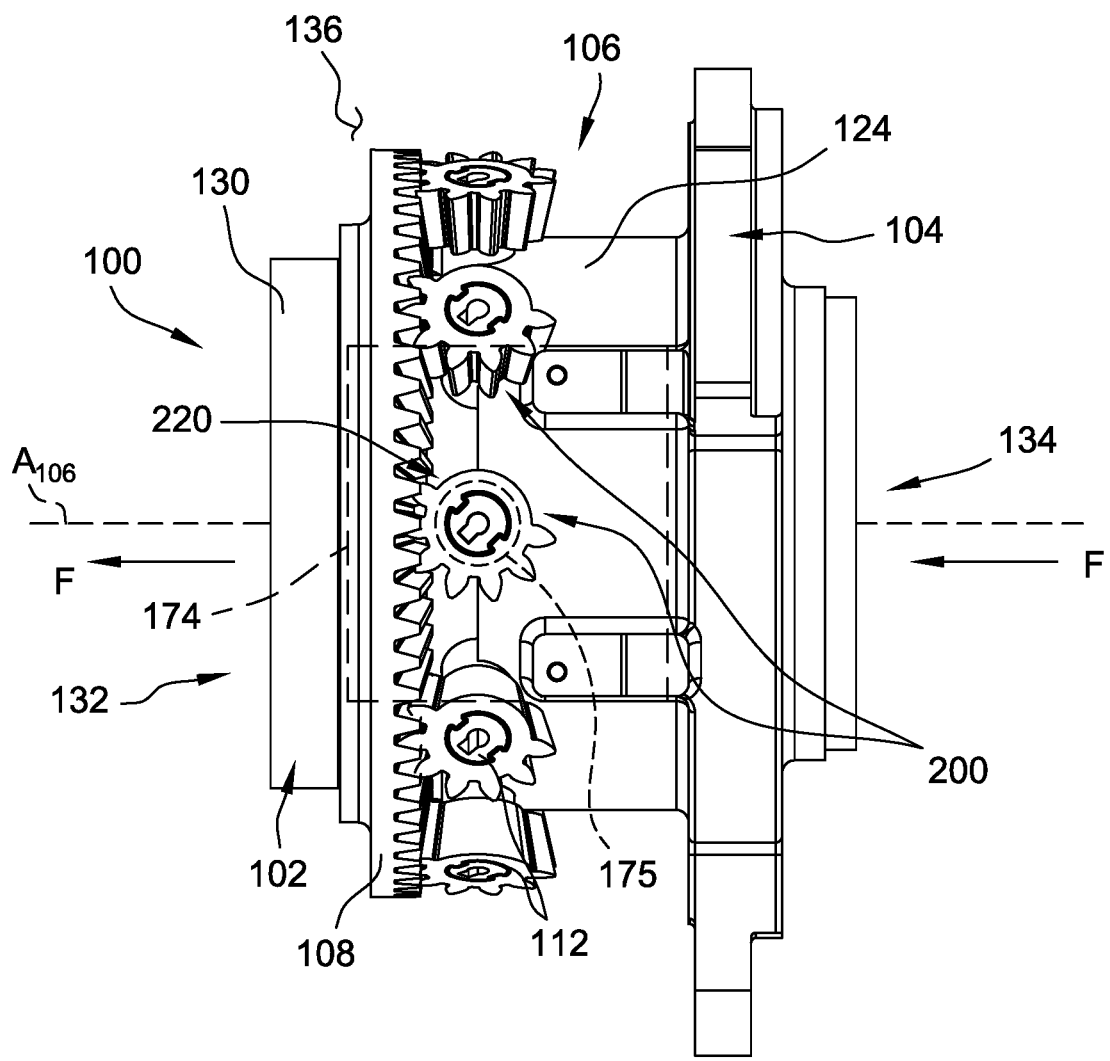
FIG. 2 is a side view of the variable inlet guide vane apparatus shown in FIG. 1.
Figure 3:
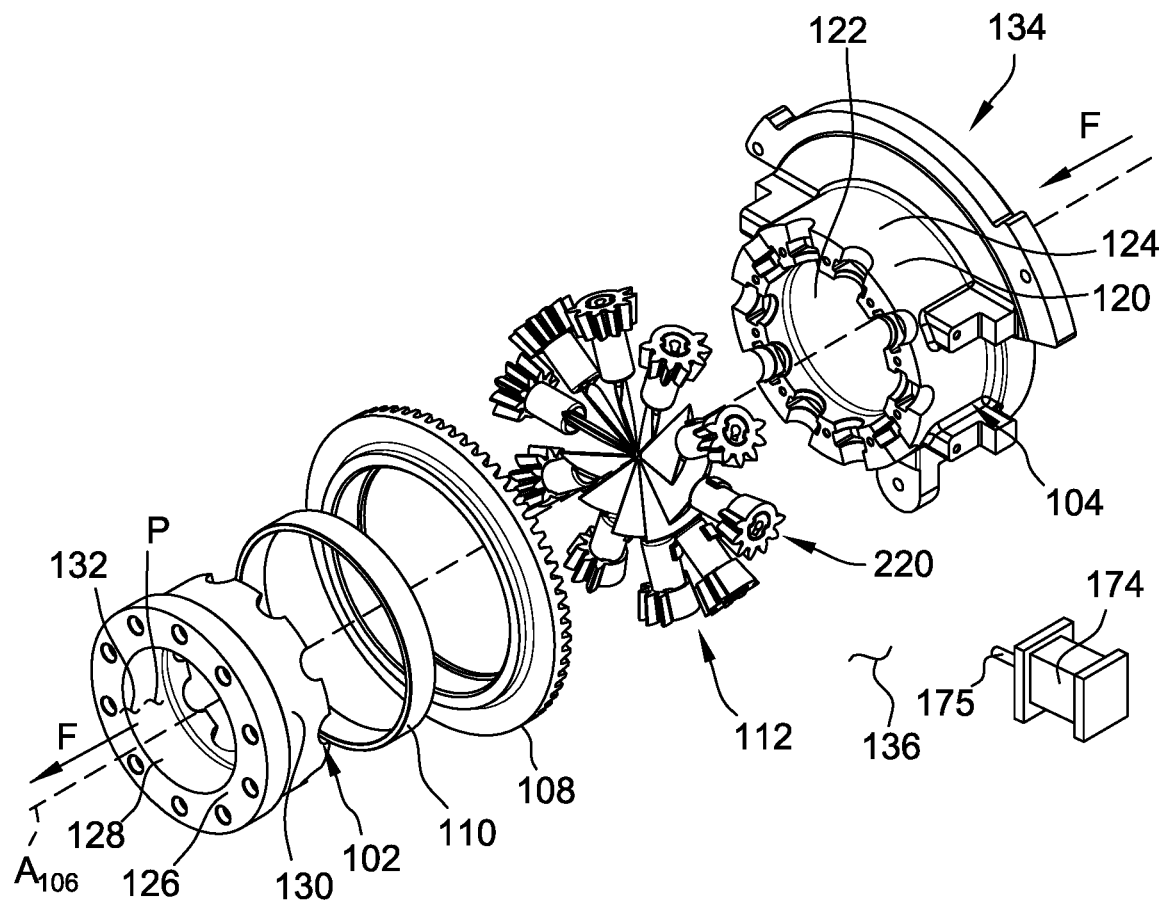
FIG. 3 is an exploded view of the variable inlet guide vane apparatus shown in FIG. 1.

FIG. 2 is a side view of the inlet guide 100, and FIG. 3 is an exploded view of the inlet guide 100. In the illustrated embodiment, the inlet guide 100 includes a first housing portion 102 and a second housing portion 104. The first housing portion 102 and the second housing portion 104 can be connected to form a vane housing assembly 106. The second housing portion 104 is positioned axially upstream from the first housing portion 102 relative to the direction of fluid flow. The inlet guide 100 also includes a ring gear 108 rotatably connected to the housing assembly 106. In the illustrated embodiment, the ring gear 108 is rotatably connected to the first housing portion 102. The ring gear 108 can be rotatably connected to the housing assembly 106 by a bearing, such as bearing 110 (FIG. 3). In other embodiments, the bearing 110 may be omitted. Directional terms such as "radially" and "axially" used to describe elements and features of the inlet guide 100 are used with reference to a housing axis $A_{106}$ of the vane housing assembly 106 and are used solely for ease of description. The inlet guide 100 is not limited to a particular orientation.

Inlet guide 100 further includes guide vanes 112. Each guide vane 112 is rotatable relative to the vane housing assembly 106 and is operably connected with the ring gear 108 such that rotation of the ring gear 108 causes each of the guide vanes 112 to rotate in unison. Each of the guide vanes 112 is rotatable relative to the housing assembly 106 such that the orientation of the vane 160 within a fluid flow passageway P of the housing assembly 106 is selectively adjustable. In some embodiments, the guide vanes 112 are rotatable relative to the housing assembly 106 in unison The inlet guide 100 can also include one or more motors 174 operably connected to one or more of the guide vanes 112 to selectively rotate the guide vanes 112. The illustrated inlet guide 100 includes a motor 174 mounted to a motor mount on the second housing portion 104. The motor 174 is operably coupled to one of the guide vanes 112, also referred to as a drive guide vane, by a driveshaft 175. As described further herein, rotation of the drive guide vane by the motor 174 causes rotation of the ring gear 108, which in turn causes rotation of the other guide vanes 112, also referred to as follower guide vanes. The motor 174 can include any suitable motor that enables the inlet guide 100 to function as described herein, including, for example and without limitation, electric motors. In some embodiments, the motor 174 is a stepper motor. In other embodiments, the motor 174 includes a synchronous motor that operates based on rotation feedback from one or more of the follower vanes, e.g., using a potentiometer or position sensor coupled to one or more of the follower vanes, to ensure all vanes are driven to the desired angle. The motor 174 may include for example and without limitation a DC motor, brushed or brushless, and a synchronous AC motor.

With additional reference to FIG. 3, the first housing portion 102 includes a first annular wall 126 having a first inner surface 128 and a first outer surface 130. The second housing portion 104 includes a second annular wall 120 having a second inner surface 122 and a second outer surface 124. The first inner surface 128 and the second inner surface 122 defines the boundary of a fluid flow passageway P extending through the vane housing assembly 106. The vane housing assembly 106 has the housing axis $A_{106}$ extending through the fluid flow passageway P. The first housing portion 102 defines an exit or outlet 132 of fluid flow passageway P, and the second housing portion 104 defines an inlet 134 of the fluid flow passageway P. The fluid flow F enters the vane housing assembly 106 at the inlet 134, passes through the fluid flow passageway P, and leaves the vane housing assembly 106 at the outlet 132. The fluid flow F flows through the fluid flow passageway P in a direction that is generally parallel to the housing axis $A_{106}$. Fluid flow F leaving the exit 132 has a pre-swirl imparted by the guide vanes 112, as described in further detail herein.

The vane housing assembly 106 includes an exterior area 136 surrounding the first outer surface 130 and the second outer surface 124 and located generally radially outward from the housing assembly 106. In the illustrated embodiment, at least a portion of each of the guide vanes 112 is disposed between the first housing portion 102 and second housing portion 104, and at least a portion of the guide vane 112 and the ring gear 108 is arranged in the exterior area 136 of the vane housing assembly 106. Accordingly, the ring gear 108 and at least a portion of the guide vane 112 are accessible (e.g., to an operator or technician) for inspection and/or repairs without requiring inlet guide 100 to be disassembled. By way of example, an operator or technician can access the ring gear 108 and a portion of the guide vanes 112 (e.g., vane gears, described in more detail herein) without first disconnecting the first housing portion 102 from the second housing portion 104.

Figure 4:
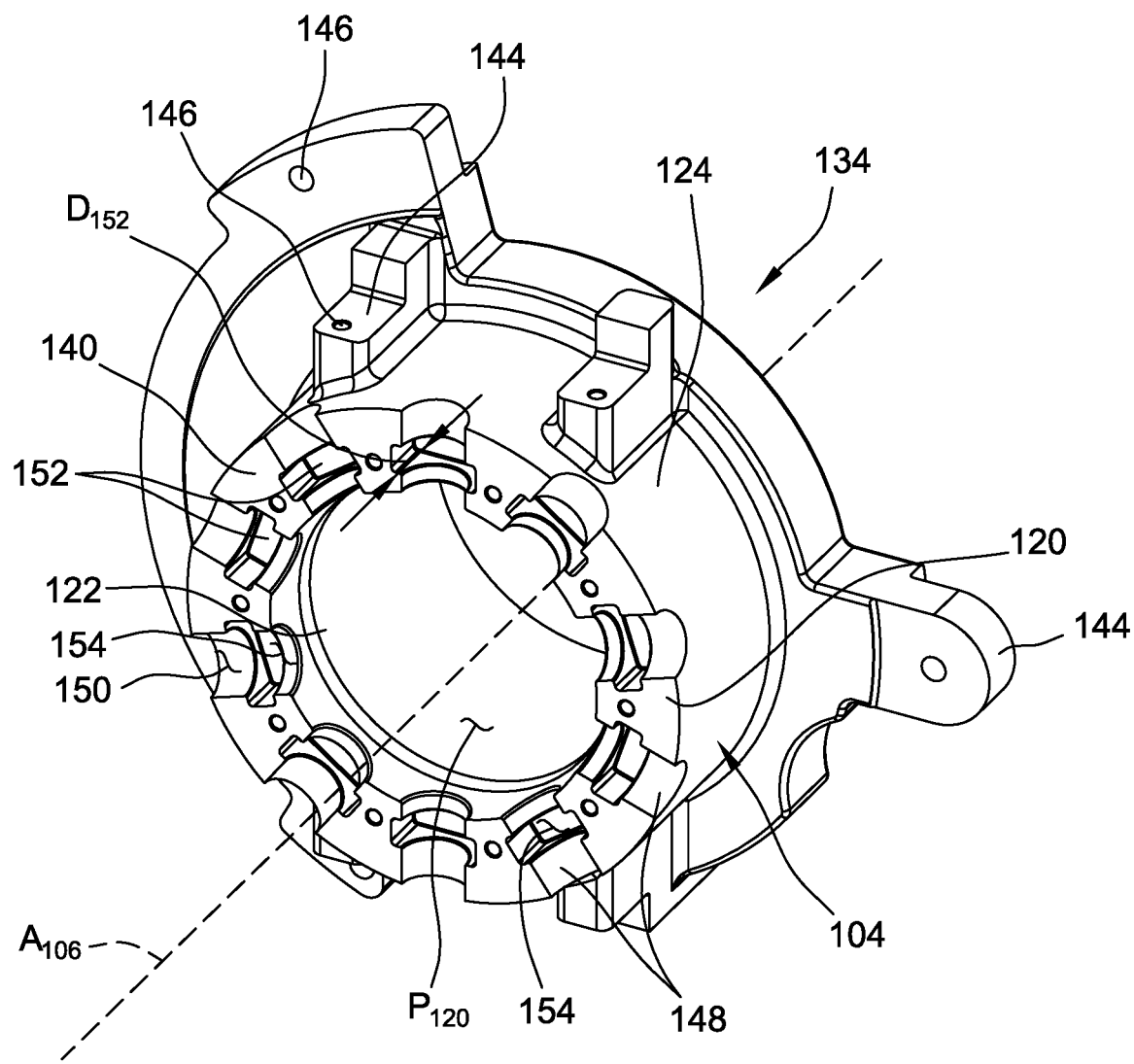
FIG. 4 is a perspective view of the second housing portion for use with the variable inlet guide vane apparatus shown in FIG. 1.
Figure 5:
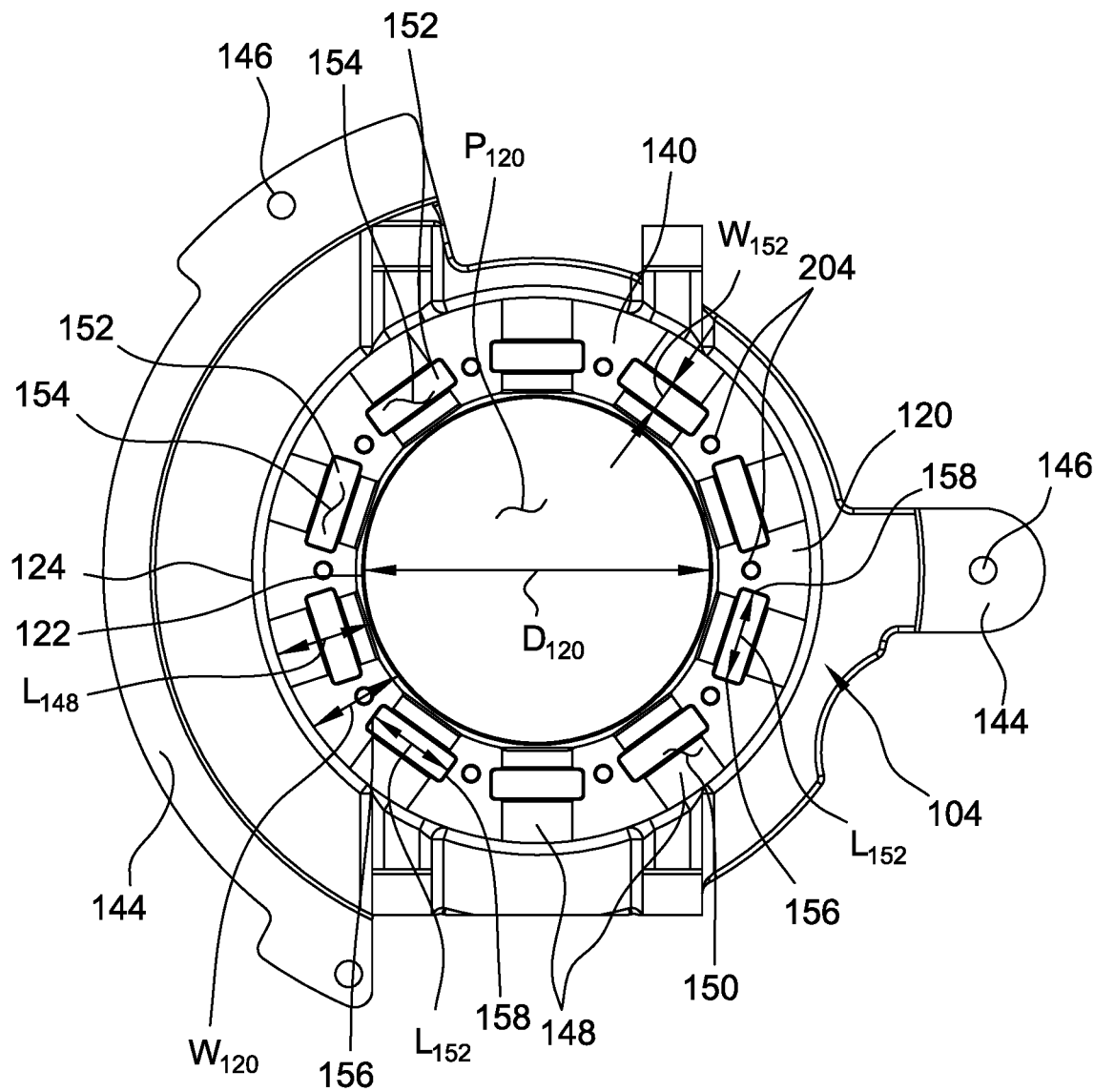
FIG. 5 is a rear or downstream view of the second housing portion shown in FIG. 4.
Figure 6:
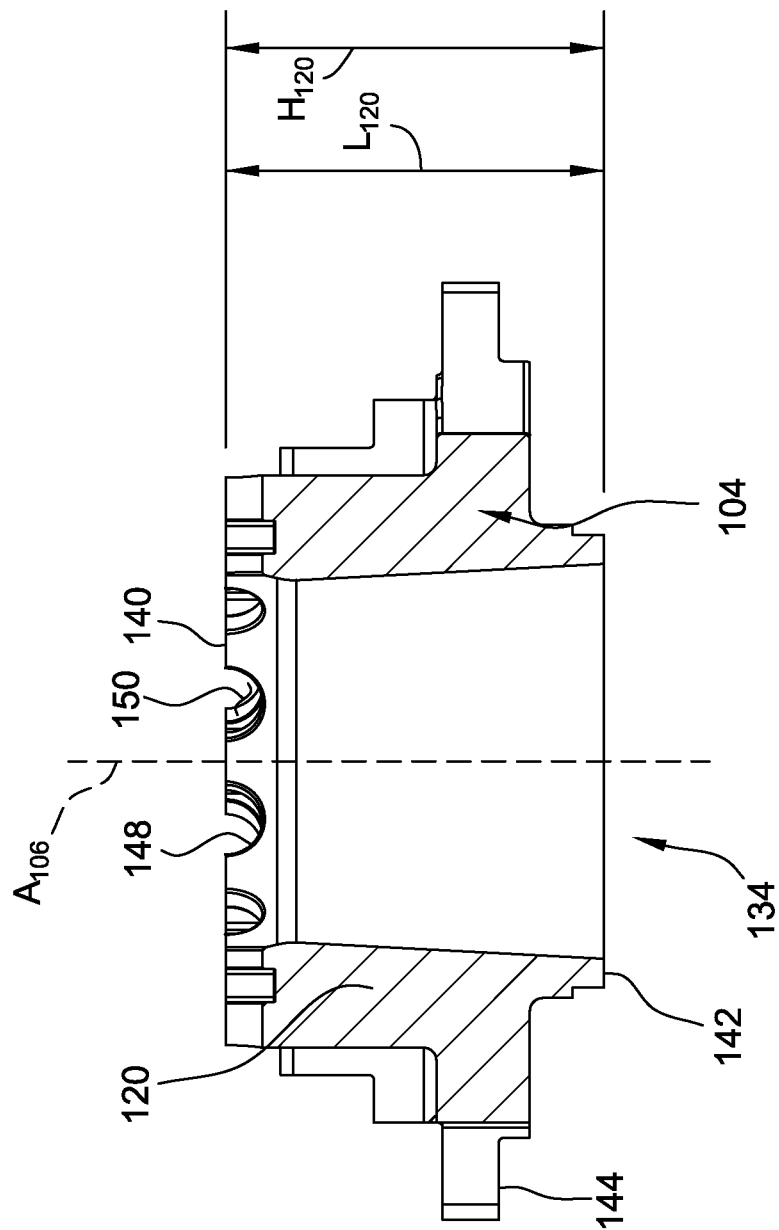
FIG. 6 is a sectional view of the second housing portion shown in FIG. 4.

FIG. 4 is a perspective view of the second housing portion 104. FIGS. 5 and 6 are a rear view and a sectional view, respectively, of the second housing portion 104. The second annular wall 120 includes a downstream surface 140 and an upstream surface 142. The downstream surface 140 is generally annular in shape. The second annular wall 120 may have a width $W_{120}$ extending between the second outer surface 124 and the second inner surface 122. (FIG. 5). The second annular wall 120 may have a height $H_{120}$ extending between the downstream surface 140 and the upstream surface 142. (FIG. 6). The second inner surface 122 defines the boundary of a second fluid flow passageway $P_{120}$ that includes a diameter $D_{120}$ defined by the second inner surface 122. In the illustrated embodiment, the second fluid flow passageway $P_{120}$ is generally conical in shape and the diameter $D_{120}$ decreases in a direction from the inlet 134 to the outlet 132 along the axis $A_{106}$. In other embodiments, the second fluid flow passageway $P_{120}$ can be generally cylindrical in shape and the diameter $D_{120}$ defined by the second inner surface 122 is generally constant. The second fluid flow passageway $P_{120}$ has a length $L_{120}$. In the illustrated embodiment, the length $L_{120}$ corresponds to the height $H_{120}$ of the second annular wall 120. The housing axis $A_{106}$ extends through the second fluid flow passageway $P_{120}$. The upstream surface 142 is generally planar and may be mounted to a compressor. Alternatively, the second housing portion 104 may be mounted to any suitable structure in proximity to the inlet of a compressor. The dimensions of the compressor, e.g., width $W_{120}$, height $H_{120}$, diameter $D_{120}$, and length $L_{120}$, may be scaled to the size of the compressor and the aerodynamic needs of the compressor.

With reference to FIGS. 4-6, the second housing portion 104 includes one or more flanges 144 extending radially outward from the second annular wall 120. The flange 144 may extend generally perpendicular to the second annular wall 120. The flanges 144 include one or more fastener openings 146 for receiving suitable fasteners (e.g., screws, bolts, etc.) to connect the second housing portion 104 to a compressor.

With reference again to FIG. 5, the downstream surface 140 includes second channel surfaces 148, each defining a corresponding second channel 150. Each of the second channel surfaces 148 are arranged in a radially symmetric pattern about the housing axis $A_{106}$. In the illustrated embodiment, the downstream surface 140 of the second annular wall 120 includes ten second channel surfaces 148 defining ten second channels 150 arranged in a radially symmetric pattern about the housing axis $A_{106}$. In alternative embodiments, the downstream surface 140 may include any number of second channels surfaces 148 that enables the inlet guide 100 to function as described herein. For example, in some embodiments, there are six second channel surfaces 148 defining six second channels 150.

In the illustrated embodiment, each of the second channel surfaces 148 are identical, having the same size and shape. In the illustrated embodiment, the second channel surfaces 148 are in the shape of a segment of a cylindrical surface. Accordingly, the second channels 150 are generally in the shape of a half-cylinder. The second channel surface 148 has a second channel length $L_{148}$ extending from the second inner surface 122 to the second outer surface 124. In the illustrated embodiment, the second channel surfaces 148 and second channels 150 extend through the entire width $W_{120}$ of the second annular wall 120. In other embodiments, the second channel surfaces 148 extend only partially through the width W 120 of the second annular wall 120. The second channel surfaces 148 are sized and shaped such that second channels 150 are sized and shaped to receive at least a portion of the guide vanes 112 therein, as described in further detail herein.

In the illustrated embodiment, each second channel surface 148 includes a secondary channel surface 152 defining a slot 154. The secondary channel surface 152 extends radially from the second channel surface 148, such that the slot 154 has a depth $D_{152}$ extending from the second channel surface 148 (FIG. 4). The secondary channel surface 152 defining the slot 154 includes a first end 156 and a second end 158, and a secondary channel length $L_{152}$ extending therebetween (FIG. 5). The secondary channel surface further defines a slot width $W_{152}$.

Figure 7:
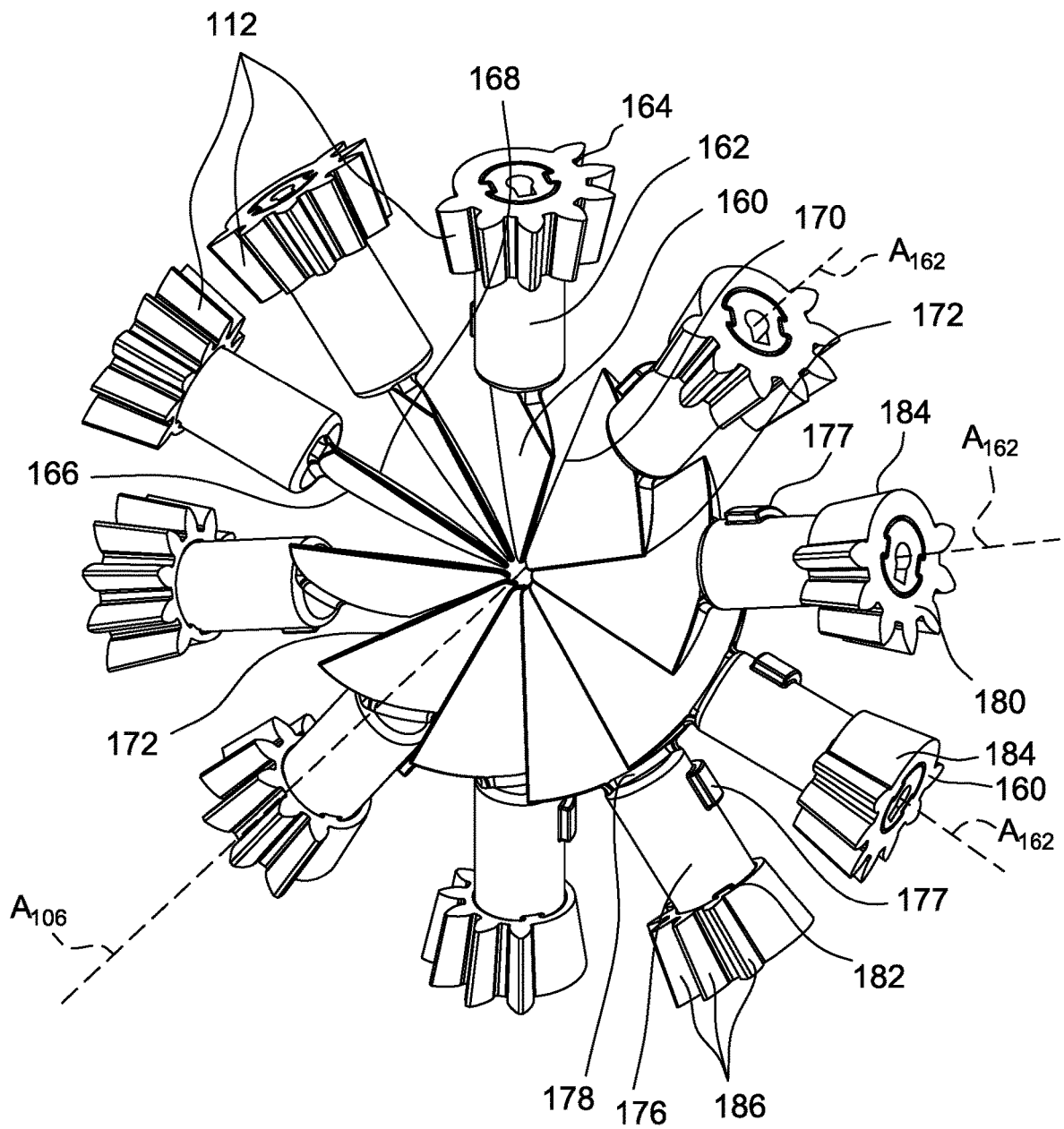
FIG. 7 is a perspective view of the guide vanes for use with the variable inlet guide vane apparatus shown in FIG. 1.

FIG. 7 is a perspective view of the guide vanes 112. Each of the guide vanes 112 includes a vane 160, a stem 162, and a vane gear 164. The guide vanes 112 are arranged in a radially symmetric pattern mirroring the radially symmetric pattern of the second channel surfaces 148 on the second housing portion 104. In the illustrated embodiment, there are ten guide vanes 112 corresponding to the ten second channel surfaces 148. In other embodiments, the inlet guide 100 can include any suitable number of guide vanes 112 that enables the inlet guide 100 to function as described herein. For example, in some embodiments there may be six guide vanes 112 corresponding to six second channel surfaces 148.

In the illustrated embodiment, the vane 160 is made integral with the stem 162. For example, the vane 160 made integral with the stem 162 by molding as a single integral piece. In alternative embodiments, the vane 160 may be formed separately from and connected or attached to the stem 162.

The vane 160 is substantially triangular, in the illustrated embodiment, and includes a first vane side 166 and an opposing second vane side 168. The first and second vane sides 166, 168 are substantially planar. The first and second vane sides 166 and 168 connect at a trailing edge 170 and a leading edge 172. The trailing and leading edges 170 and 172 may be knife-like in shape. The vanes 160 are selectively rotatable to selectively occlude or block fluid flow F through the fluid flow passageway $P_{120}$. The vanes 160 may be prevented from being rotated to arrange the vanes 160 in a closed position, in which the trailing edge 170 of each guide vane is in contact with, or in proximity with, the leading edge 172 of an adjacent guide vane, as described herein.

The first and second housing portions 102 and 104 cooperatively define guide vane passages $P_{160}$. Each of the vanes 160 may cover one of the vane passages $P_{160}$. Each vane passage $P_{160}$ is a portion of the fluid flow passageway P. The vane passages $P_{160}$ are spaced circumferentially about the fluid flow passageway P. The vane 160 is any shape or size enabling the inlet guide 100 to function as describe herein. Additionally, the shape and size of the vane 160 may be selected based upon the intended application of the inlet guide 100. For example, the size, shape, and angle of the vane 160 may be selected based on the type and configuration of the compressor, the operating conditions, and/or the fluid type used with the compressor. Each of the guide vanes 112 is rotatable relative to the vane housing assembly 106 such that the orientation of the vane 160 within the fluid flow passageway P is selectively adjustable.

Figure 8:
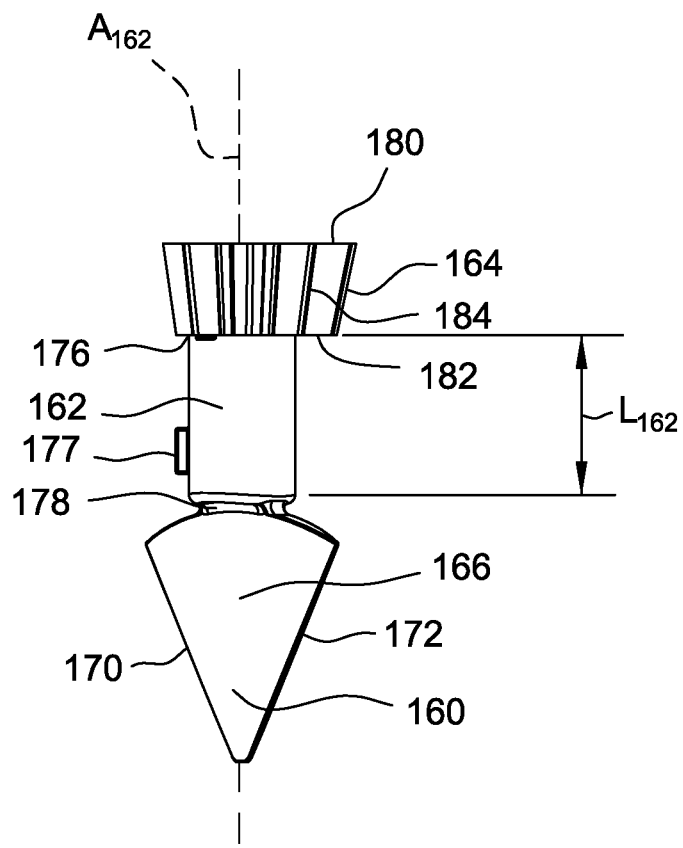
FIG. 8 is a side view of one of the guide vanes shown in FIG. 7.
Figure 9:
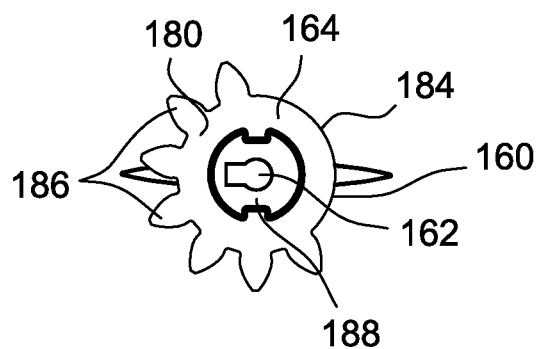
FIG. 9 is a top view of the guide vane shown in FIG. 8.

FIGS. 8 and 9 are side and top views, respectively, of one of the guide vanes 112 shown in FIG. 7. The stem 162 extends along a stem axis $A_{162}$ from a first, inner end 178 to a second, outer end 176. The vane 160 is disposed at the first, inner end 178 of the stem 162, and the vane gear 164 is disposed at the second, outer end 176 of the stem 162. The stem 162 has a stem length $L_{162}$ between the inner end 178 and the outer end 176. The stem length $L_{162}$ may be substantially like the second channel length $L_{148}$. When the stem 162 is arranged within one of the second channels 150, the stem axis $A_{162}$ is perpendicular to the housing axis $A_{106}$.

In this illustrated embodiment, the guide vane 112 includes a stop 177 extending circumferentially about the stem 162, and radially outward in a direction generally perpendicular to the stem axis $A_{162}$, from the stem 162. The stop 177 is sized and shaped to fit within the slot 154 defined by the secondary channel surface 152. In the illustrated embodiment, the stop 177 is generally rectangular in shape. The stop 177 and the secondary channel surface 152 are sized and shaped such that the stop 177 slides along the length $L_{152}$ relative to the secondary channel surface 152 when the guide vane 112 rotates relative to the first housing portion 102 and the second housing portion 104 about the stem axis $A_{162}$. In addition, the slot width $W_{152}$ is sized and shaped such that the stop 177 contacts the secondary channel surface 152, preventing the guide vane 112 from translating along a direction parallel to the stem axis $A_{162}$. The slot width $W_{152}$ is sized to provide sufficient clearance between the stop 177 and the secondary channel surface 152 such that the stop 177 may translate along the slot length $L_{152}$.

The stop 177 extends only partially around the circumference of the stem 162. In the illustrated embodiment, the stop 177 extends circumferentially an arc angle of about 45° around the circumference of the stem 162. In other embodiments, the stop 177 may extend an arc angle greater than or less than 45°. For example, in some embodiments, the stop 177 may extend an arc angle of 90° around the stem 162. In another example, the stop 177 may extend an arc angle of 30° around the stem 162.

The stop 177 limits rotation of the guide vane 112 about the stem axis $A_{162}$ when the stop 177 engages with a stop surface of at least one of the first housing portion 102 or the second housing portion 104, as described further herein.

The vane gear 164 includes a top surface 180, a bottom surface 182, and a wall 184 extending between the top surface 180 and the bottom surface 182. The wall 184 is generally cylindrical in shape (FIG. 8). The vane gear 164 includes gear teeth 186 extending radially outward from the wall 184. In some embodiments, such as the illustrated embodiment, the vane gear 164 is a tapered gear—i.e., the gear teeth 186 are tapered or angled radially inward or outward from the top surface 180 to the bottom surface 182. In some embodiments, the vane gear 164 may be a bevel gear. In some embodiments, the vane gear 164 may be a helical gear.

In the illustrated embodiment, the vane gear 164 is a partial gear in which the gear teeth 186 extend around only a portion of the wall 184. In the illustrated embodiment, the gear teeth 186 extend an arc angle of approximately 225° around the wall 184. In other embodiments, the gear teeth 186 may extend around the wall 184 an ac angle of greater than or less than 225°. Further, in the illustrated embodiment, the gear teeth 186 are positioned generally opposite the stop 177 on the stem 162. Accordingly, during operation, the vane gear 164 is arranged to engage with the ring gear 108, while the stop 177 is captured within the slot 154.

Figure 10:
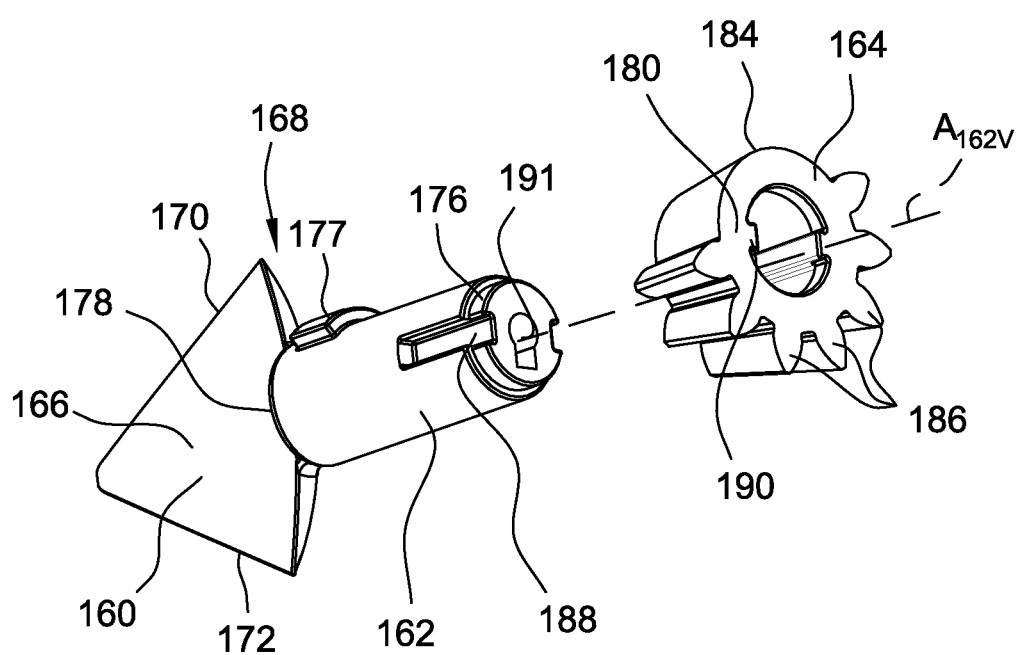
FIG. 10 is an exploded view of the guide vane shown in FIG. 8.

FIG. 10 is an exploded view of the guide vane 112. In some embodiments, the vane gear 164 is removably connected to the stem 162 of the guide vane 112. In the illustrated embodiment, for example, the outer end 176 of the stem 162 is received within a central opening of the vane gear 164 to connect the vane gear 164 to the stem 162. In some embodiments, the stem 162 and the vane gear 164 may be connected using a press-fit engagement when the outer end 176 is disposed within the central opening of the vane gear 164. Additionally, and/or alternatively, an epoxy, or other suitable adhesive, may be used to connect the stem 162 and the vane gear 164. Additionally, in the illustrated embodiment, the stem 162 includes a key 188 disposed at the outer end 176 and the vane gear 164 includes a keyed boundary 190 defining a keyed opening 189 sized and shaped to receive the key 188. When the key 188 is disposed within the keyed opening 189, the stem 162 and the vane gear 164 are frictionally engaged and rotation of the vane gear 164 is transmitted to the stem 162. In some embodiments, the key 188 may be press fit within the keyed opening 189. In some embodiments, the key 188 may include a channel, and the boundary 190 may include a key that is sized and shaped to fit within the channel. Alternatively, and/or additionally, the key 188 and the boundary 190 may include any suitable features that enable frictional engagement of the vane gear 164 and the stem 162. In other embodiments, the vane gear 164 is integral with the guide vane (e.g., the vane gear 164 is made integral with the stem 162).

In the illustrated embodiment, the guide vane 112 includes an alignment feature 191. The alignment feature 191 receives a portion of the driveshaft of a motor, such as driveshaft 175 of motor 174, enabling the guide vane 112 to be operably connected to the motor. Accordingly, the alignment feature 191 is shaped complimentary to the driveshaft. For example, the alignment feature 191 may be keyed, semicircular, or star shaped, or any suitable shape such that the alignment feature 191 mates with the driveshaft in order to frictionally couple the driveshaft to the alignment feature 191. Alternatively, and/or additionally, the alignment feature 191 may be sized and shaped to receive an alignment tool (not shown) to facilitate alignment and mounting of the guide vanes 112 to the vane housing assembly 106.

Figure 11:
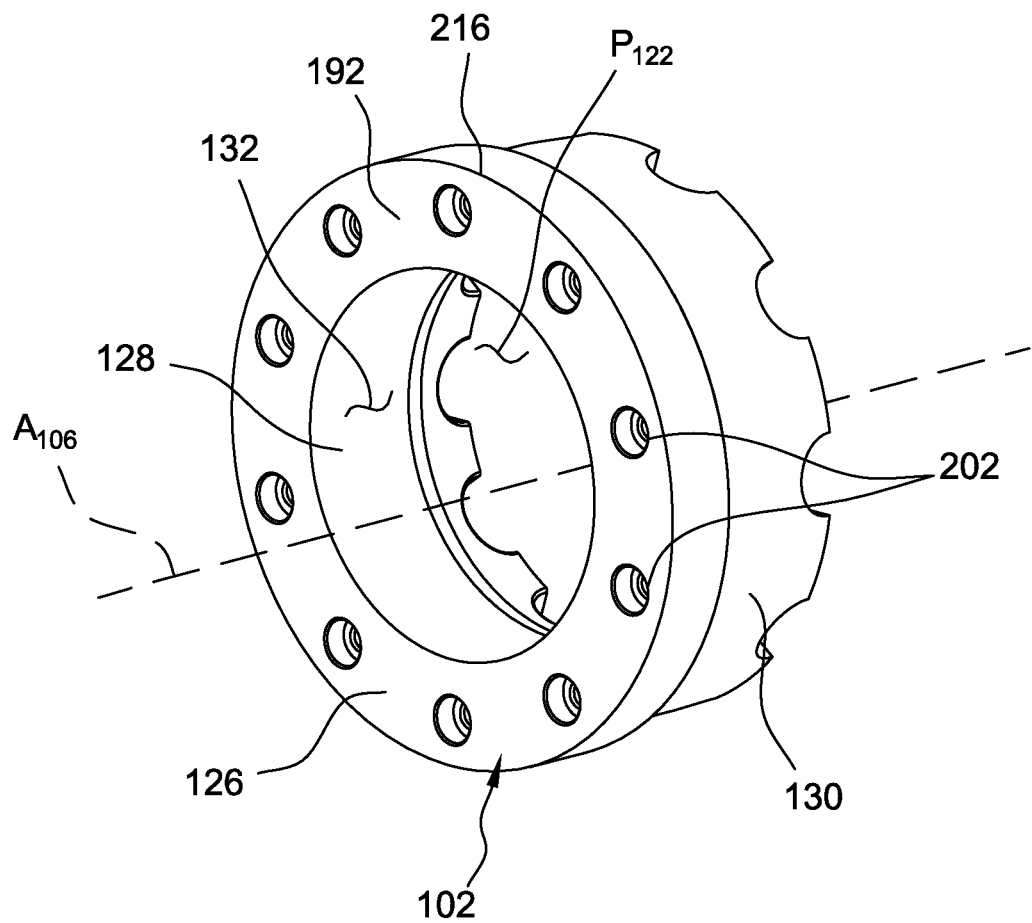
FIG. 11 is a perspective view of the first housing portion for use with the variable inlet guide vane apparatus shown in FIG. 1.
Figure 12:
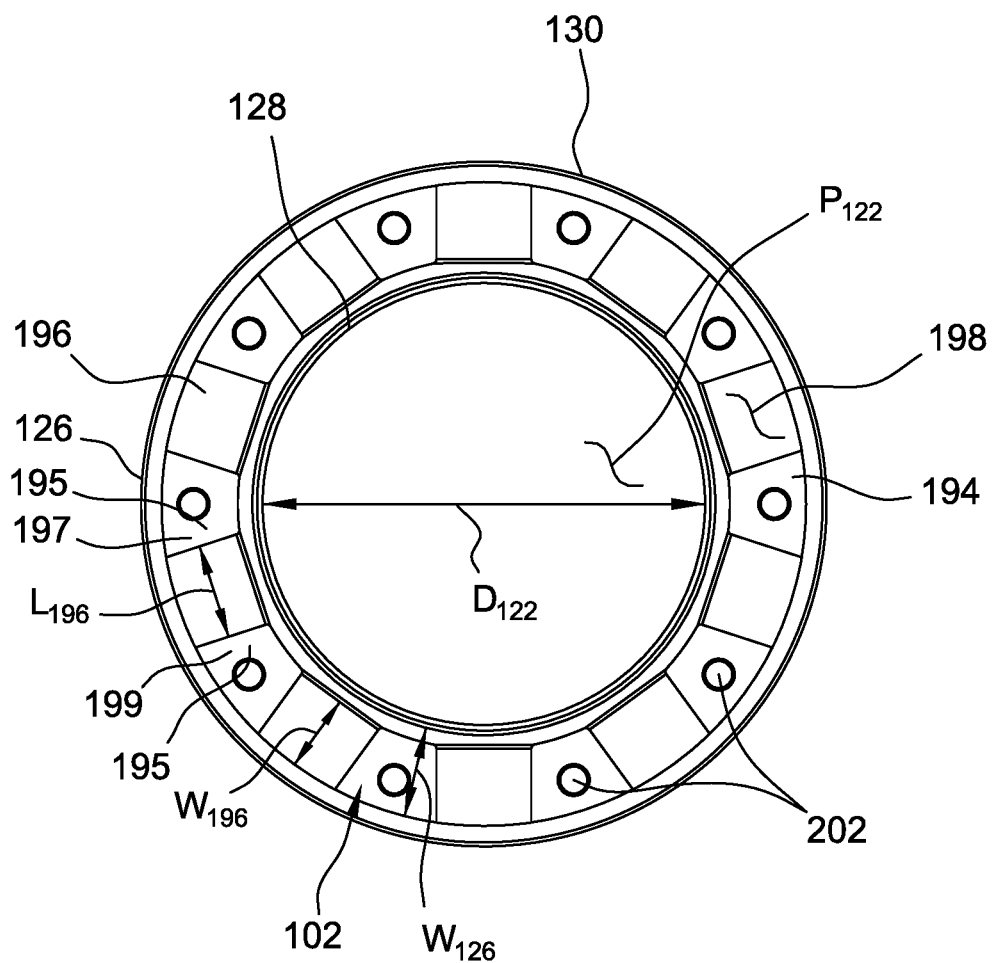
FIG. 12 is a front or upstream view of the first housing portion shown in FIG. 11.
Figure 13:
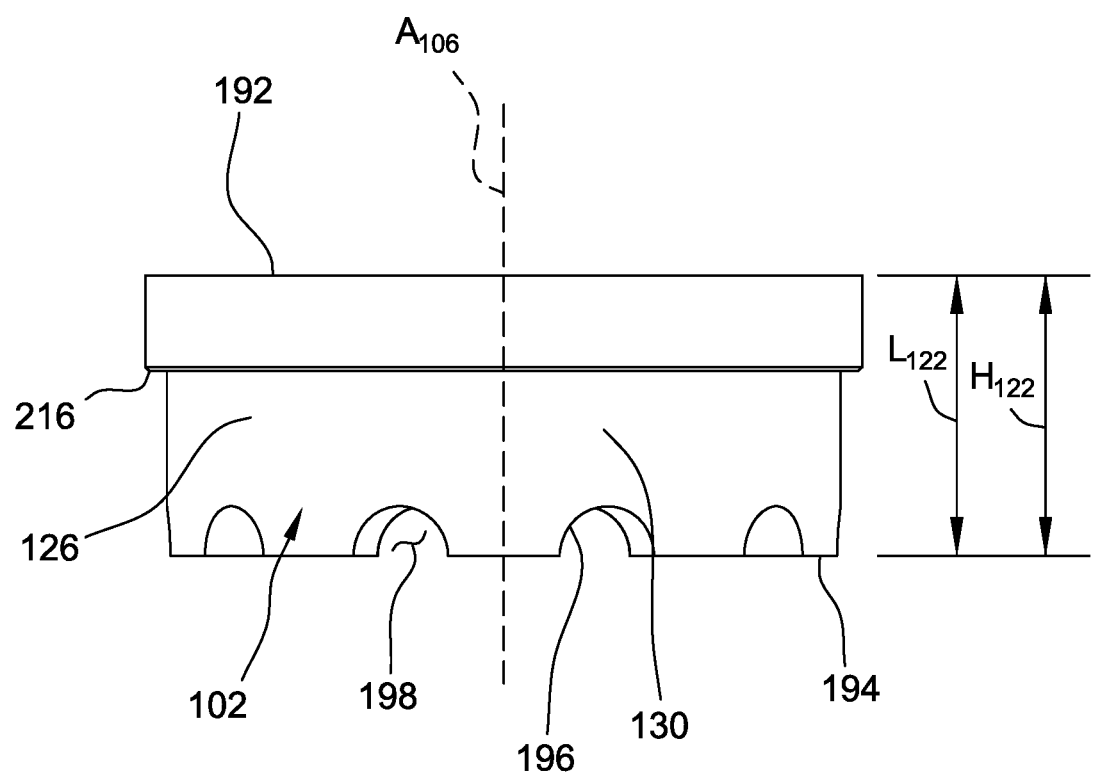
FIG. 13 is a side view of the first housing portion shown in FIG. 11.

FIG. 11 is a perspective view of the first housing portion 102. The first annular wall 126 includes a downstream surface 192 and an upstream surface 194. The upstream surface 194 is generally annular in shape. The first annular wall 126 has a width $W_{126}$ extending between the first outer surface 130 and the first inner surface 128. (FIG. 12). The first annular wall 126 may have a height $H_{122}$ extending between the downstream surface 192 and the upstream surface 194 (FIG. 13). The first inner surface 128 defines the boundary of a first fluid flow passageway $P_{122}$. The first fluid flow passageway $P_{122}$ is generally cylindrical in shape having a diameter $D_{122}$ defined by the first inner surface 128. In the illustrated embodiment, the diameter $D_{122}$ is substantially similar to the diameter $D_{120}$ of the second inner surface 122. (FIG. 12) The first fluid flow passageway $P_{122}$ has a length $L_{122}$ corresponding the height $H_{122}$ of the first annular wall 126 (FIG. 13). The housing axis $A_{106}$ extends through the first fluid flow passageway $P_{122}$. When the first housing portion 102 and the second housing portion 104 are connected, creating the vane housing assembly 106, the first fluid flow passageway $P_{120}$ and the second fluid flow passageway $P_{122}$ are aligned creating the fluid flow passageway P. The dimensions of the first annular wall 126, e.g., width $W_{126}$, height $H_{122}$, diameter $D_{122}$, and length $L_{122}$, may be scaled to the size of the compressor and/or the aerodynamic needs of the compressor.

FIG. 12 is a front view of the first housing portion 102. The upstream surface 194 of the first housing portion 102 includes first channel surfaces 196 that define first channels 198. The first channel surfaces 196 are arranged in a radially symmetric pattern, about the housing axis $A_{106}$ that mirrors the radially symmetric pattern of the second channel surfaces 148 and the radially symmetric pattern of the guide vanes 112. In the illustrated embodiment, each of the first channel surfaces 196 are substantially similar having approximately the same size and shape. In other example embodiments, the first channel surfaces 196 are identical to the second channel surfaces 148. Each of the first channel surfaces 196 includes a first channel length $L_{196}$ and a first channel width $W_{196}$ (FIG. 12). The first channel width $W_{196}$ may extend from the first inner surface 128 to the first outer surface 130.

In the illustrated embodiment, the first channel surfaces 196 are in the shape of a segment of a cylindrical surface. Accordingly, the first channels 198 are generally half-cylindrical in shape. In the illustrated embodiment, the first channel surface 196 extends along the entire width $W_{126}$ of the upstream surface 194. In other embodiments, the first channel surfaces 196 extend only partially along the width of the upstream surface 194.

As mentioned above, the stop 177 limits rotation of the guide vanes 112 about the stem axis $A_{162}$ when the stop 177 engages one or more stop surfaces 195. In the illustrated embodiment, for example, the first housing portion 102 includes a first stop surface 197 and a second stop surface 199 (FIG. 12). When the guide vane 112 rotates in a first direction (e.g., counterclockwise), the stop 177 slides within slot 154, until the stop 177 engages the first stop surface 197, preventing or inhibiting further rotation of the guide vane 112. When the guide vane 112 rotates in a second direction (e.g., clockwise), the stop 177 slides within slot 154, until the stop 177 engages the second stop surface 199, preventing or inhibiting further rotation of the guide vane 112.

In some embodiments, contact between the stop 177 and the stop surfaces 195 serves as a stop for a stepper motor. Specifically, in the illustrated embodiment, the stop 177 is disposed within the slot 154 and when the guide vane 112 rotates, the stop 177 travels along the slot length $L_{154}$. The guide vanes 112 may include a drive guide vane operably connected to a motor, and follower guide vanes that rotate in response to rotation of the drive guide vane. In such embodiments, the stepper motor may rotate the drive guide vane 112 until the stop 177 on one of the guide vanes 112 engages with either the first stop surface 197 or the second stop surface 199, arresting the rotational motion of all the guide vanes 112 and stopping the stepper motor.

In the illustrated embodiment, the slot 154, the stop 177, and the first stop surface 197 and the second stop surface 199 are configured to allow the motor to rotate the guide vanes 112 a total of 90°. For example, the guide vanes 112 are oriented in a first rotational position of 0°, or a neutral position, such that the first vane side 166 or the second vane side 168 of each guide vane 122 is arranged generally parallel to the housing axis $A_{106}$ and/or parallel to the fluid flow F entering the inlet 134. In the illustrated embodiment, when the guide vanes 112 are in the neutral position, the stop 177 is arranged in a center of the slot 154. The stop 177 and the stop surfaces 195 are arranged to allow the guide vanes 112 to be oriented between +45° and −45° degrees relative to the neutral position such that the first vane side 166 or the second vane side 168 may be arranged at a desired angle relative to the housing axis $A_{106}$ and the fluid flow F entering the inlet 134 depending on the desired operating condition.

The second housing portion 104 can include one or more of the stop surfaces 195. For example, in some embodiments, the first end 156 and the second end 158 includes stop surfaces that interact with stop 177. In such embodiments, the guide vane 112 rotates, in either the first or second directions, until the stop 177 engages with the stop surfaces, preventing or inhibiting further rotation of the guide vane 112.

When the first housing portion 102 is connected to the second housing portion 104, each of the second channels 150 are aligned with each of the first channels 198, such that the first and second channels 198 and 150 cooperatively form guide vane openings 200 extending radially through the vane housing assembly 106 (FIG. 2). The boundary of the guide vane openings 200 is defined by the first channel surface 196 and second channel surface 148. Each guide vane opening 200 is generally cylindrical and is sized and shaped to receive at least a portion of the stem 162 of one of the guide vanes 112 therein. The stem 162 of each guide vane 112 is rotatable relative to the first channel surface 196 and second channel surface 148 such that each guide vane 112 rotates within one of the guide vane openings 200 about its respective stem axis $A_{162}$. In some embodiments, the first channel surface 196 and the second channel surface 148 includes a plain bearing to facilitate rotation of the stem 162 relative to the first channel surface 196 and the second channel surface 148. Additionally, and/or alternatively, the stem 162 and the first channel surface 196 and second channel surface 148 may include suitable bearings enabling the inlet guide 100 to function as described herein. In some embodiments, the stem 162 and/or the first channel surface 196 and the second channel surface 148 may be impregnated with Teflon or other suitable lubricants. In the example embodiment, the inlet guide 100 may be used with an oil free compressor.

The first housing portion 102 and the second housing portion 104 may be connected in any suitable manner that enables the inlet guide 100 to function as described herein. In the illustrated embodiment, the first housing portion 102 is connected to the second housing portion 104 by screws. More specifically, the first housing portion 102 includes fastener openings 202 extending through the first annular wall 126, and the second housing portion 104 includes fastener openings 204 corresponding to the arrangement of the openings 202 on the first housing portion 102. Each of the fastener openings 204 may include a threaded portion, such that a threaded bolt or screw (not shown) may be inserted through the opening 202 on the first housing portion 102 and threaded into the threaded portion of the openings 204 on the second housing portion 104. In other embodiments, the first housing portion 102 and second housing portion 104 may be connected using any suitable fasteners to connect the first housing portion 102 and second housing portion 104 together forming the vane housing assembly 106.

When the stem 162 of each guide vane 112 is arranged within one of the guide vane openings 200 of the vane housing assembly 106, the vane gears 164 are arranged in the exterior area 136 of the vane housing assembly 106, and each of the vanes 160 is arranged within the fluid flow passageway P. Accordingly, in the illustrated embodiment, each of the vane gears 164 are accessible to an operator for inspection and/or repair without needing to disconnect or disassemble the first housing portion 102 and the second housing portion 104. In embodiments in which the vane gear 164 is removably connected to the stem 162, the vane gear 164 can be readily replaced with another vane gear. For example, an operator may replace a worn or damaged vane gear 164 by disconnecting the vane gear 164 from the stem 162 and connecting a new or repaired vane gear 164 to the stem 162. As mentioned above, the vane gear 164 and the stem 162 may be formed of a single piece. Furthermore, disconnecting the first housing portion 102 from the second housing portion 104 provides access to all the guide vanes 112, simultaneously.

Figure 14:
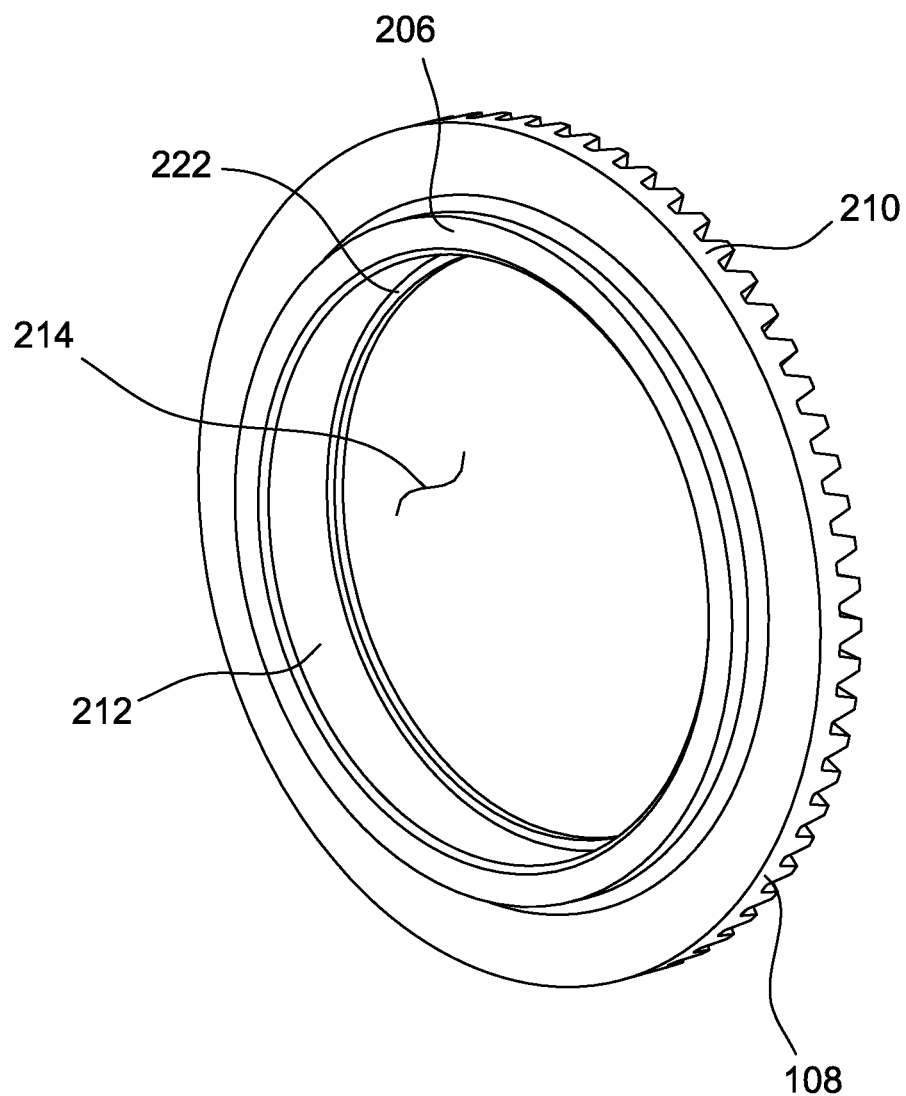
FIG. 14 is a perspective view of the ring gear for use with the variable inlet guide vane apparatus shown in FIG. 1.

FIG. 14 is a perspective view of the ring gear 108. The ring gear 108 includes a first surface 206, a ring second surface 208, and an annular wall 210 extending therebetween. The annular wall 210 includes a ring inner surface 212 defining the boundary of a ring opening 214. The inner surface 212 is sized and shaped such that at least a portion of the first housing portion 102 can be received within the ring opening 214. In the illustrated embodiment, the ring gear 108 is rotatably connected to and rotatable relative to the first housing portion 102. In other embodiments, the ring gear 108 is rotatably connected to the second housing portion 104.

The first housing portion 102 includes a lip 216 extending radially outward from the first outer surface 130 (FIG. 13). The lip 216 engages a surface 217 of the press fit bearing 110 when the bearing 110 is disposed around the first outer surface 130. The lip 216 engages the bearing 110 to prevent or inhibit axial translation of the bearing 110 relative to the first housing portion 102. Alternatively, when the ring gear 108 is rotatably connected to the first housing portion 102, the lip 216 may be in contact with the first surface 206 of the ring gear 108 to prevent or inhibit translation axially of the ring gear 108 relative to the first housing portion 102.

Figure 15:
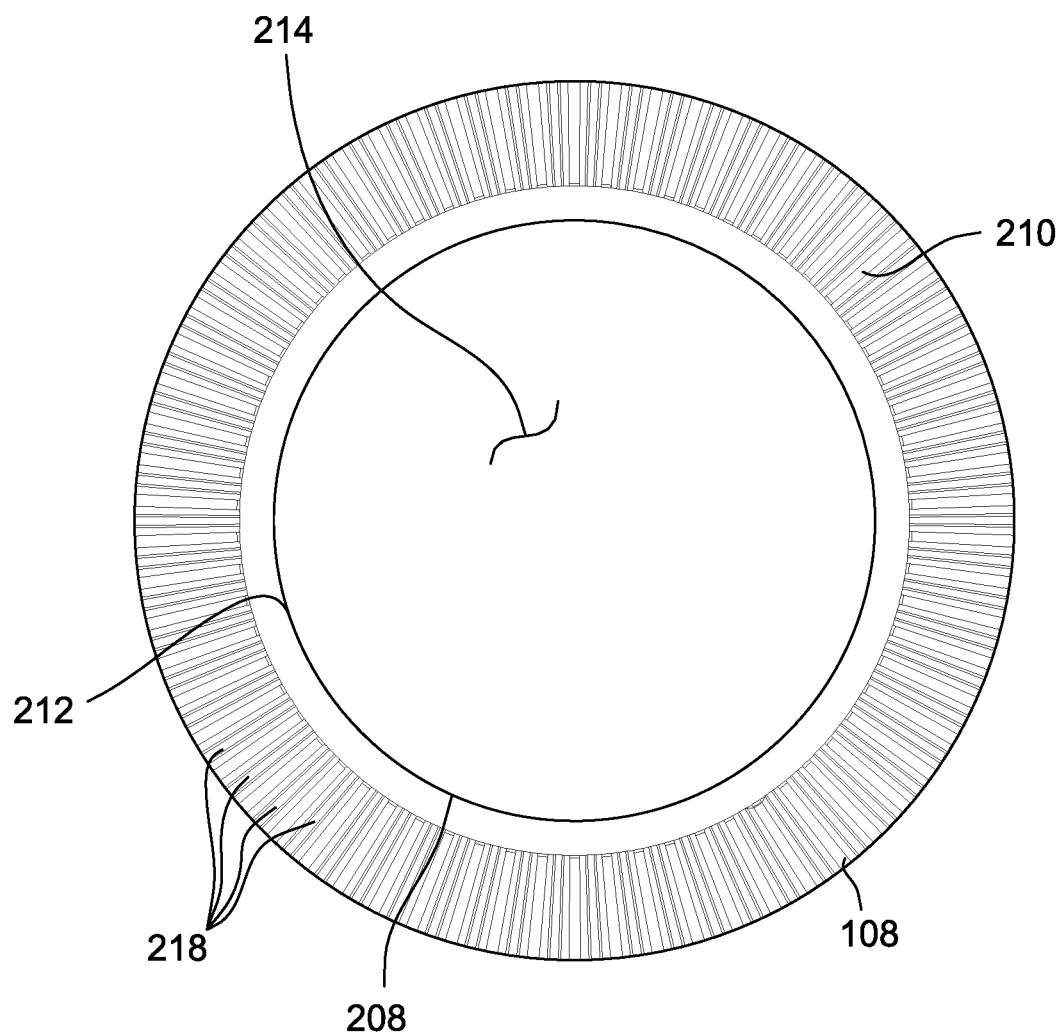
FIG. 15 is an end view of the ring gear shown in FIG. 14.
Figure 16:
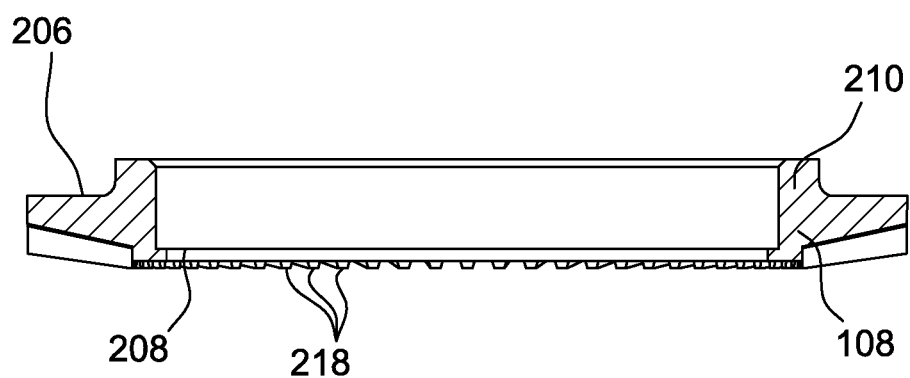
FIG. 16 is a section view of the ring gear shown in FIG. 14.

FIG. 15 is an end view of the ring gear 108 and FIG. 16 is a section view of the ring gear 108. The ring second surface 208 of the ring gear 108 includes gear teeth 218. The gear teeth 218 of the ring gear 108 are sized and shaped to mate with the gear teeth 186 of each of the vane gears 164 of the guide vanes 112. Rotation of the ring gear 108, about the housing axis $A_{106}$, is transmitted to the vane gears 164, causing rotation of the guide vanes 112 about the vane axis $A_{162}$, within the guide vane openings 200 of the vane housing assembly 106. The ring gear 108 further includes a feature 222 disposed on the inner surface 212. The feature 222 engages with the bearing 110, preventing the bearing 110 from translating axially relative to the ring gear 108. The feature 222 may span about the circumference of the inner surface 212. In some example embodiments, the feature 222 includes a lip.

The ring gear 108, and the vane gears 164, are arranged in the exterior area 136 of the vane housing assembly 106 enabling an operator to inspect and/or repair the ring gear 108 without disconnecting the first housing portion 102 and second housing portion 104. The accessibility of the ring gear 108 and the vane gears 164 is beneficial in that it reduces the time required to inspect and/or repair the ring gear 108 and the vane gears 164. In addition, the accessibility of the vane gears 164 and the ring gear 108, without disassembling the first housing portion 102 and the second housing portion 104, helps prevent bearing surfaces between the first channel surface 196, the second channel surface 148, and the stem 162 from being exposed to debris and/or contaminates.

In the illustrated embodiment, at least one of the guide vanes 112 is a drive guide vane 220. The drive guide vane 220 is operably connected to motor 174 (e.g., by the driveshaft 175), and the motor drives rotation of the drive guide vane 220. Rotation of the drive guide vane 220 causes rotation of the ring gear 108, which transmits rotation to the rest of the guide vanes 112, referred to as follower guide vanes. Accordingly, all the guide vanes 112 rotate in unison. In some embodiments, the motor is a stepper motor. In some embodiments, the motor is communicatively connected to a controller and the controller transmits one or more instructions to the motor causing the motor to rotate the drive guide vane 220 in order to arrange the guide vanes 112 in a selected orientation relative to the fluid flow F.

Figure 17:
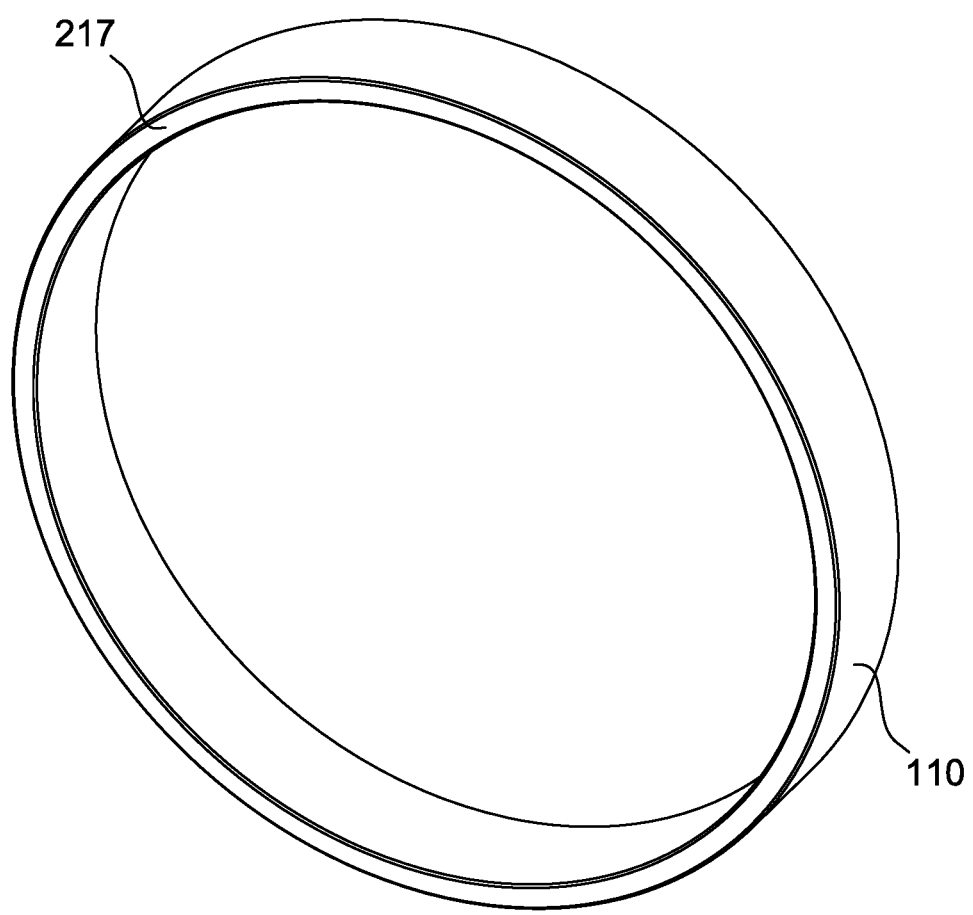
FIG. 17 is a perspective view of the bearing of the variable inlet guide vane apparatus shown in FIG. 1.

FIG. 17 is a perspective view of the bearing 110. The bearing 110 may be arranged between the first outer surface 130 of the first housing portion 102 and the ring inner surface 212 of the ring gear 108. The bearing 110 facilitates rotation of the ring gear 108 about the first housing portion 102. In some embodiments, the bearing 110 is connected to the ring gear 108, e.g., the bearing 110 is press fit into frictional engagement with the ring inner surface 212. Accordingly, the ring gear 108 and the bearing 110 rotate relative to the first housing portion 102. Alternatively, the bearing 110 may be press fit onto first housing portion 102 such that the bearing 110 and the first housing portion 102 are frictionally engaged and the ring gear 108 rotates relative to the bearing 110 and the first housing portion 102.

The bearing 110 may be a non-lubricating bearing or a self-lubricating bearing. As such, the bearing 110 does not require application of lubricants. For example, the bearing 110 is constructed of bronze and/or bronze composite. In some embodiments, the bearing 110 is bronze coated. The bearing 110 may be impregnated with lubricants or the bearing 110 may include one or more graphite plugs. In alternative embodiments, the bearing 110 may include any suitable type of bearing 110 that enables the inlet guide 100 to function as described herein. In other embodiments, the bearing 110 may be omitted and the ring gear 108 may rotate about the first housing portion 102, without the use of a bearing.

Figure 18:
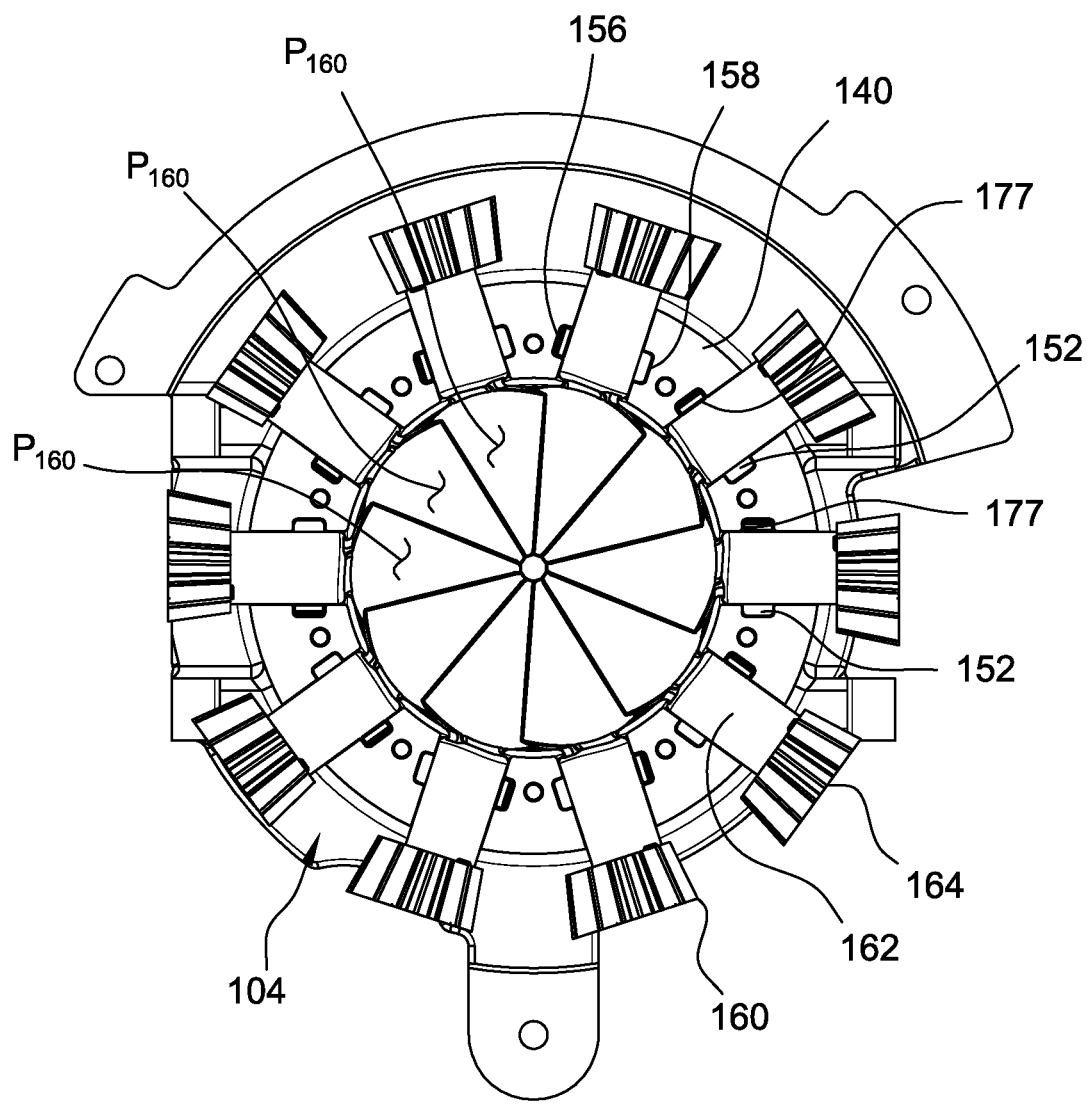
FIG. 18 is a rear or downstream view of the variable inlet guide vane apparatus having the first housing portion, ring gear, and bearing disconnected, illustrating the guide vanes arranged within a second channel on the second housing portion.

FIG. 18 is a rear view of the inlet guide 100, having the first housing portion 102, ring gear 108, and bearing 110 removed therefrom to illustrate the arrangement of the guide vanes 112 arranged within the second channels 150. As described above, simultaneous rotation of the guide vanes 112 changes the orientations of the vanes 160 relative to fluid flow F entering the inlet 134. For example, the guide vanes 112 may be rotated, in unison, to arrange the inlet guide 100 to any suitable position based on the operational needs of the compressor. For example, the guide vanes 112 may be rotated, in unison, to arrange the inlet guide 100 to a fully open or neutral position. In the fully open position, the guide vanes 112 are arranged such that the first vane side 166 and the second vane side 168 of the vanes 160 are arranged generally parallel to the direction of the fluid flow: F such that the vanes 160 do not substantially impede the fluid flow F through the fluid flow passageway P. In the fully open position, the vanes 160 align the fluid flow F creating a more laminar fluid flow F profile thereby increasing efficiency of the compressor. The guide vanes 112 may be rotated to arrange the vanes 160 in any suitable orientation relative to the fluid flow F and the fluid flow passageway P. For example, the motor may rotate the drive guide vane 220 in either a clockwise or a counterclockwise direction to adjust the orientation of the vanes 160. The position of the vanes 160 may be selected to increase the operating range of the compressor, including both surge and choke.

In some embodiments, sensors (not shown) may be attached to one or more of the guide vanes 112 to measure the rotational position of the guide vanes 112. The sensor may be communicatively coupled to the controller. The controller may use feedback received from the sensor to determine instructions for the motor. In some embodiments, one or more sensors may be used to measure the rotational speed of the guide vanes 112. For example, the guide vanes 112 may be rotated at a rotational speed of 1 rotation per min (rpm) or less.

Figure 19:
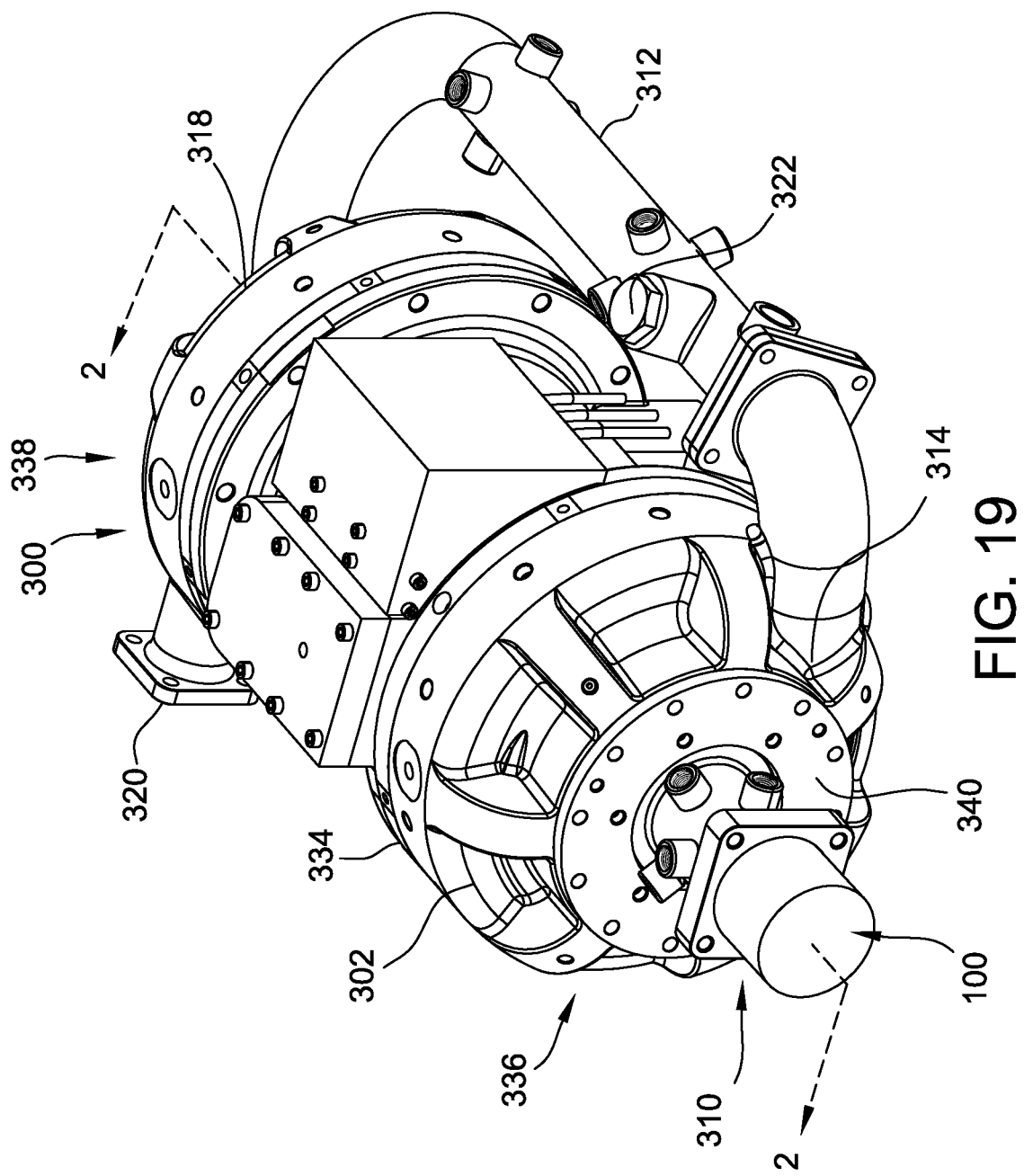
FIG. 19 is a perspective view of an assembled compressor for use with the variable inlet guide vane apparatus.
Figure 20:
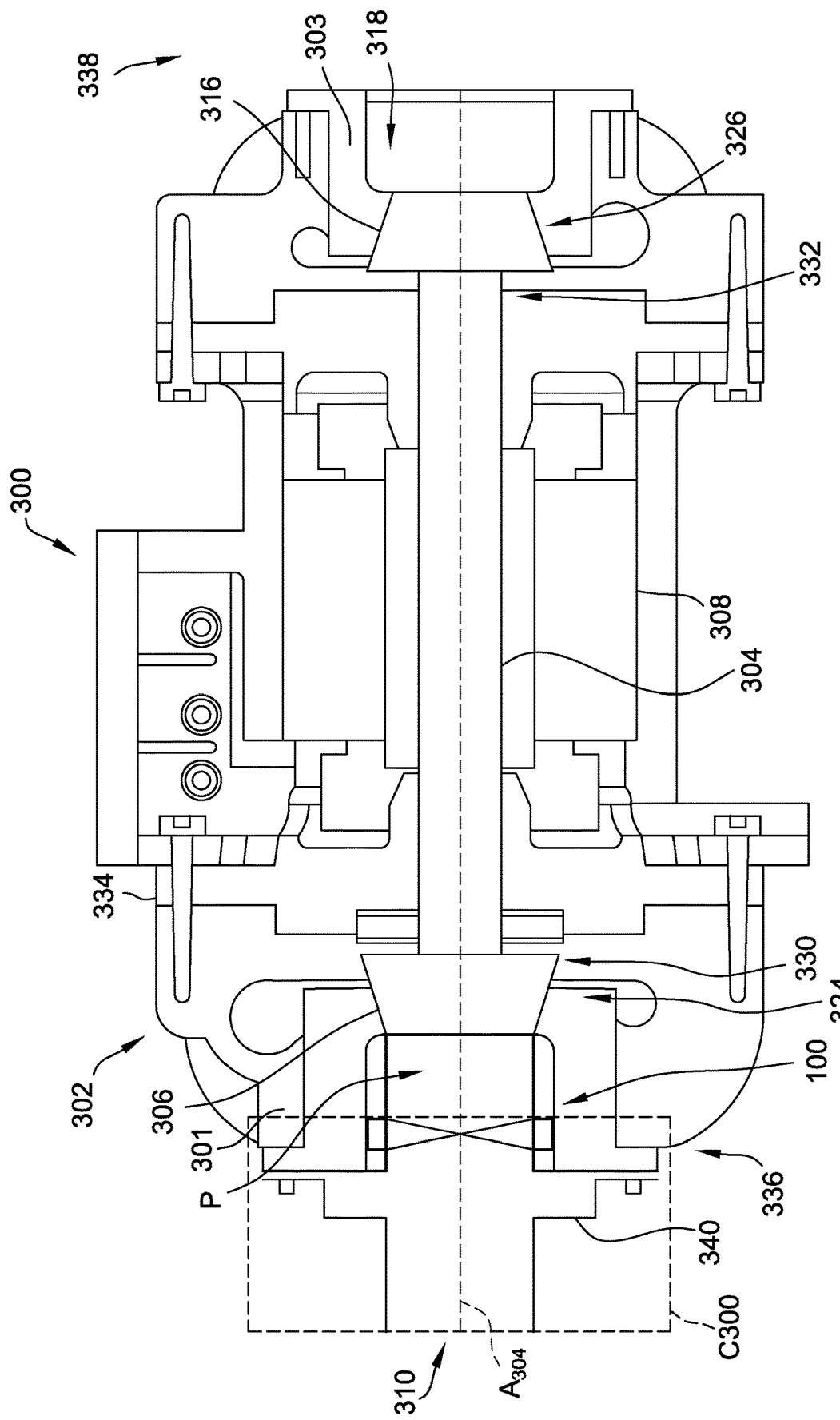
FIG. 20 is a cross-sectional view of the compressor of FIG. 19 taken along line 2-2.

FIGS. 19 and 20 are perspective and sectional views, respectively, of a compressor 300 suitable for use with the inlet guide 100 described herein. The compressor 300 is illustrated in the form of a two-stage centrifugal compressor. The compressor 300 generally includes an outer compressor housing 302 forming at least one sealed cavity within which each stage of refrigerant compression is accomplished. The compressor housing 302 includes a main body 334 that extends between a first end 336 and a second end 338. The compressor housing 302 also includes an end cap 340 connected to the main body 334 at the first end 336. The end cap 340 defines a first refrigerant inlet 310 of the compressor 300 to introduce refrigerant vapor into the first compression stage. The compressor 300 also includes a first refrigerant exit 314 adjacent the first refrigerant inlet 310, a refrigerant transfer conduit 312 to transfer compressed refrigerant from the first compression stage to the second compression stage, a second refrigerant inlet 318 defined at the second end 338 of the main body 334 to introduce refrigerant vapor into the second compression stage, and a second refrigerant exit 320 (shown in FIG. 19). Refrigerant transfer conduit 312 is operatively connected at opposite ends to the first refrigerant exit 314 and the second refrigerant inlet 318, respectively. The second refrigerant exit 320 delivers compressed refrigerant from the second compression stage to a cooling system in which compressor 300 is incorporated. The refrigerant transfer conduit 312 may further include a refrigerant bleed (not shown in FIG. 20) to add or remove refrigerant as needed at the compressor 300.

Referring to FIG. 20, the outer compressor housing 302 encloses a first compression stage 324 proximate to the first end 336 of the main body 334 and a second compression stage 326 proximate to the second end 338. The first compression stage 324 includes a first stage impeller 306 configured to impart kinetic energy to incoming refrigerant gas entering via the first refrigerant inlet 310. The kinetic energy imparted to the refrigerant by the first stage impeller 306 is converted to increased refrigerant pressure (i.e., compression) as the refrigerant velocity is slowed upon transfer to a diffuser formed between a first stage inlet ring 301 and a portion of the outer compressor housing 302. Similarly, the second compression stage 326 includes a second stage impeller 316 configured to add kinetic energy to refrigerant transferred from the first compression stage 324 entering via the second refrigerant inlet 318. The kinetic energy imparted to the refrigerant by the second stage impeller 316 is converted to increased refrigerant pressure (i.e., compression) as the refrigerant velocity is slowed upon transfer to a diffuser formed between a second stage inlet ring 303 and a second portion of outer compressor housing 302. Compressed refrigerant exits the second compression stage 326 via the second refrigerant exit (not shown in FIG. 20).

The first stage impeller 306 and second stage impeller 316 are connected at opposite ends of a driveshaft 304 that rotates about a driveshaft axis $A_{304}$. The driveshaft extends from a driveshaft first end 330 to a driveshaft second end 332 and is axisymmetric about the driveshaft axis $A_{304}$. Additionally, the driveshaft axis $A_{304}$ extends through a center of gravity of the driveshaft 304. The driveshaft 304 is operatively connected to a motor 308 positioned between the first stage impeller 306 and second stage impeller 316, such that the motor 308 rotates the driveshaft 304 about the driveshaft axis $A_{304}$. The first stage impeller 306 and the second stage impeller 316 are both connected to the driveshaft 304 such that the first stage impeller 306 and second stage impeller 316 are rotated at a rotation speed selected to compress the refrigerant to a pre-selected pressure exiting the second refrigerant exit. Any suitable motor may be incorporated into the compressor 300 including, but not limited to, an electrical motor.

The inlet guide 100 is positioned within the compressor housing 302 and arranged in proximity to the first refrigerant inlet 310. The inlet 134 to the fluid flow passageway P is fluidly connected with the first refrigerant inlet 310 and the outlet 132 of the fluid flow passageway P is fluidly connected with the first compression stage 324. In the example configuration, the housing axis $A_{106}$ extending through the fluid flow passageway P aligns with the driveshaft axis $A_{304}$. In other example configurations of the compressor 300, the housing axis $A_{106}$ and the driveshaft axis $A_{304}$ may not be aligned. During operation, the fluid flow F enters the compressor 300 via the first refrigerant inlet 310 and is channeled into the inlet guide 100 via the inlet 134 through the fluid flow passageway P. As described above, the guide vanes 112 may be arranged (e.g., by adjusting an orientation of the vanes 160) within the fluid flow passageway P such that fluid flow F exits the inlet guide 100 via the outlet 132 with a pre-swirl and enters into the first compression stage 324, and the fluid flow F contacts the first stage impeller 306 of the compressor 300 with a suitable direction.

Figure 21:
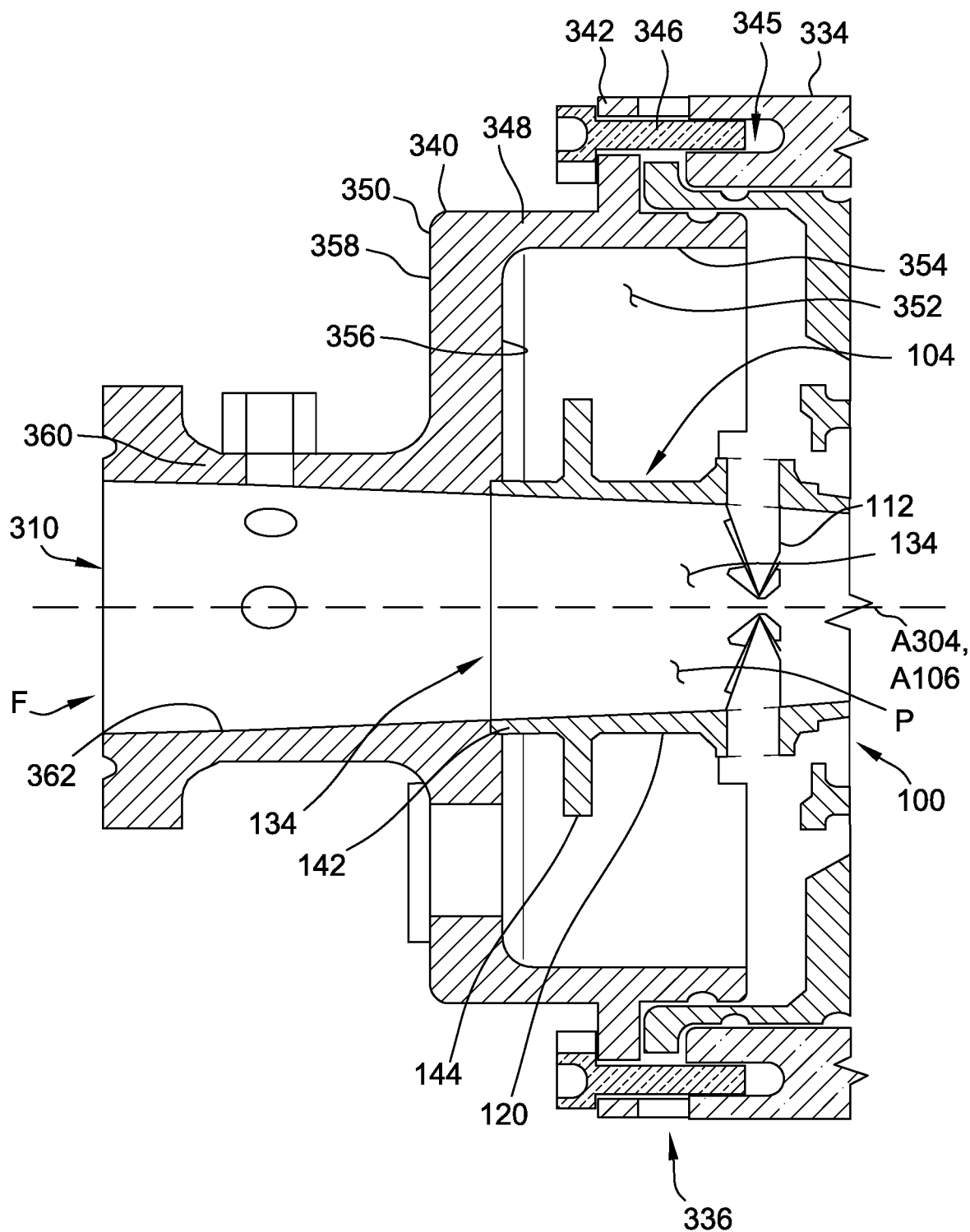
FIG. 21 is an enlarged view of a portion of the cross-sectional view of FIG. 20 indicated by Section $C_{300}$.
Figure 22:
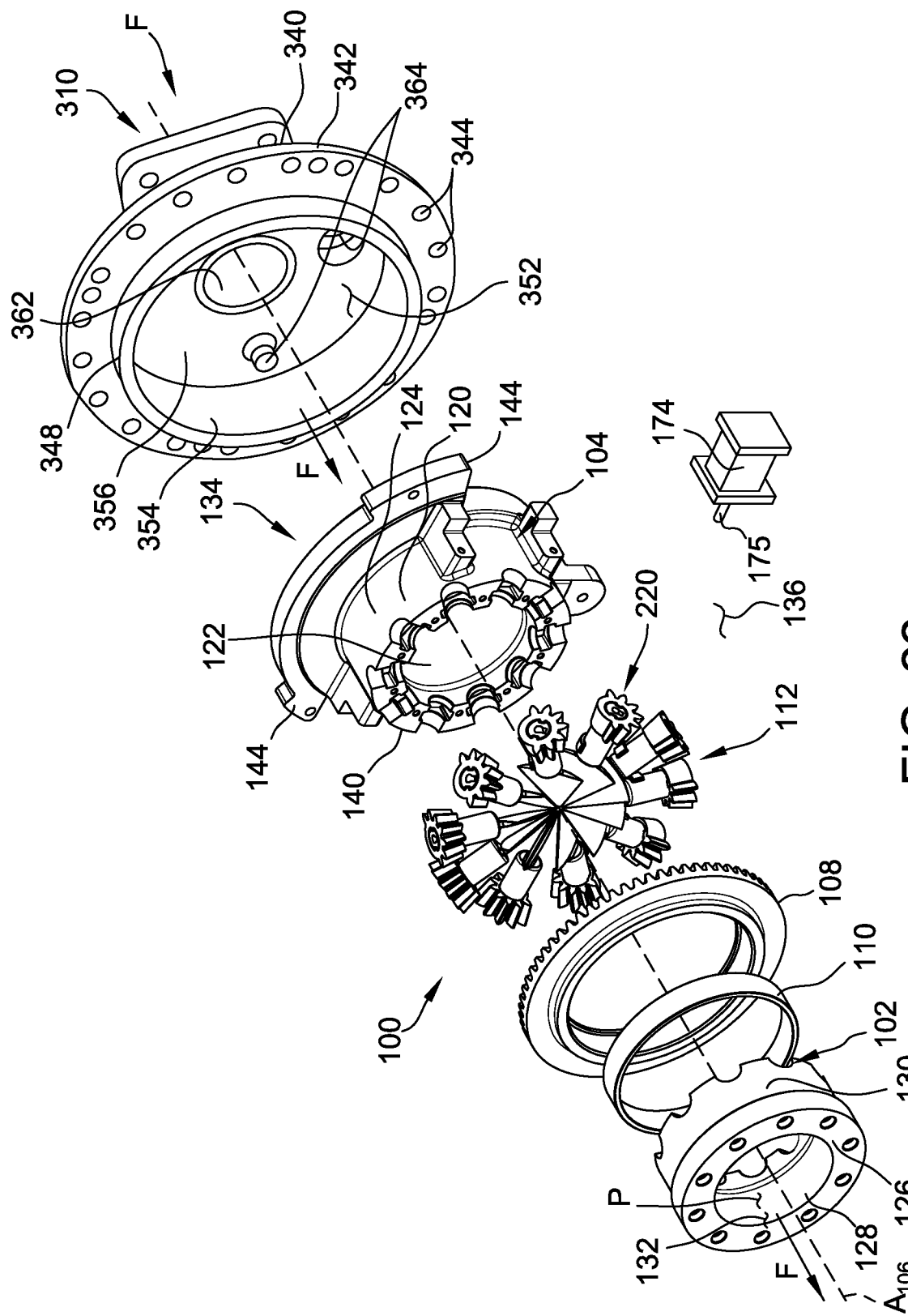
FIG. 22 is an exploded view of the variable inlet guide vane apparatus shown in FIG. 1, shown with an end cap of the compressor of FIG. 19.

FIG. 21 shows a portion of the inlet guide 100 positioned within the compressor housing 302 in proximity to the first refrigerant inlet 310 in greater detail, indicated by the Section $C_{300}$ in FIG. 20. FIG. 21 shows a portion of the inlet guide 100 adjacent and connected to the end cap 340 of the compressor housing 302. FIG. 22 shows an exploded view of the inlet guide 100, similar to FIG. 3 described above, shown with the end cap 340.

The end cap 340 includes an annular flange 342 that defines a radially outermost portion of the end cap 340. As shown in FIG. 21, the annular flange 342 is connected to the main body 334 of the compressor housing 302 at the first end 336. The annular flange 342 includes holes 344 formed therein that align with corresponding holes 345 formed in the main body 334 at the first end 336. The aligned holes 344 and corresponding holes 345 of the main body 334 receive fasteners 346 to connect the end cap 340 with the main body 334.

The annular flange 342 extends radially outwardly from an annular sidewall 348 of the end cap 340. The annular sidewall 348 extends axially from a shoulder 350 of the end cap 340. An end of the annular sidewall 348 opposite the shoulder 350 is open. A recess 352 is defined by an interior surface 354 of the annular sidewall 348 and a recessed surface 356. The recessed surface 356 is defined by the shoulder 350. The shoulder 350 also defines an exterior surface 358 opposite the recessed surface 356. The end cap 340 also includes a neck portion 360 extending axially from the shoulder 350. A central bore 362 is defined by the neck portion 360 and extends through the recessed surface 356. The central bore 362 defines the first refrigerant inlet 310. The neck portion 360 has a smaller outer diameter than the annular sidewall 348. The shoulder 350 extends radially between and joins the neck portion 360 and the annular sidewall 348. Directional terms such as "radially" and "axially" used to describe elements and features of the end cap 340 are used with reference to the driveshaft axis $A_{304}$ when the end cap 340 is installed in the compressor 300 and are used solely for ease of description. The end cap 340 is not limited to a particular orientation.

When the inlet guide 100 is connected to the end cap 340, the inlet guide 100 is partially positioned in the recess 352. The upstream surface 142 of the second annular wall 120 of the second housing portion 104 faces towards the recessed surface 356 of the end cap 340. As described above, the second housing portion 104 includes one or more flanges 144 extending radially outward from the second annular wall 120. The flanges 144 include one or more fastener openings 146 for receiving suitable fasteners (e.g., screws, bolts, etc.) to connect the second housing portion 104, and thus the inlet guide 100, with the end cap 340. In particular, at least some of the fastener openings 146 align with corresponding openings 364 formed in the shoulder 350 of the end cap 340, and the aligning openings 146 and corresponding openings 364 receive suitable fasteners to connect the second housing portion 104 with the end cap 340. The central bore 362 extending through the end cap 340 aligns with the inlet 134 defined by the second housing portion 104 to fluidly connect the first refrigerant inlet 310 with the fluid flow passageway P. As shown in FIG. 21, the central bore 362 and the inlet 134 align in conjunction with the alignment of the housing axis $A_{106}$ and the driveshaft axis $A_{304}$.

Figure 23:
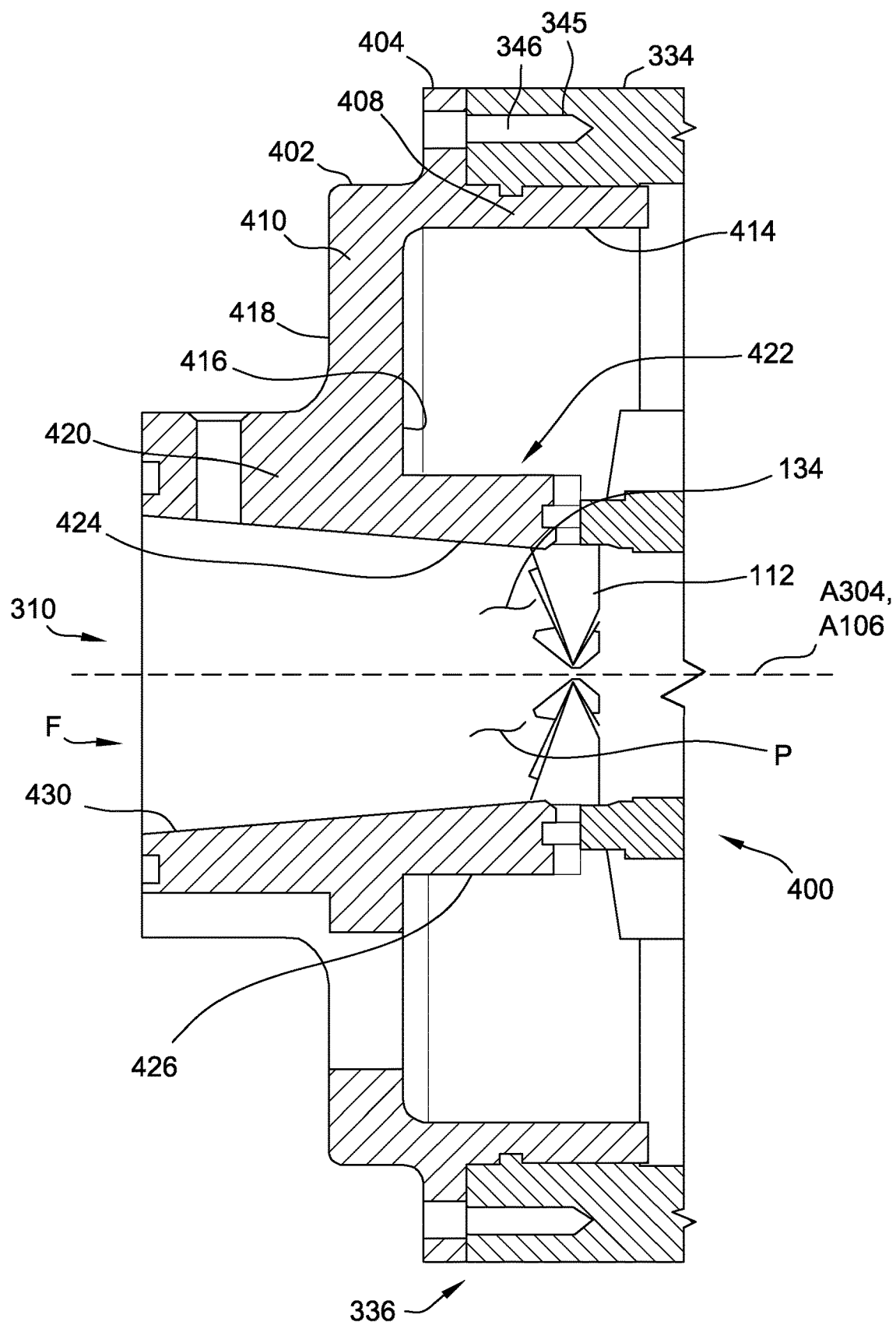
FIG. 23 is an enlarged view of a portion of the cross-sectional view of FIG. 20 indicated by Section $C_{300}$ showing another example inlet guide vane apparatus combined with an end cap of the compressor.
Figure 24:
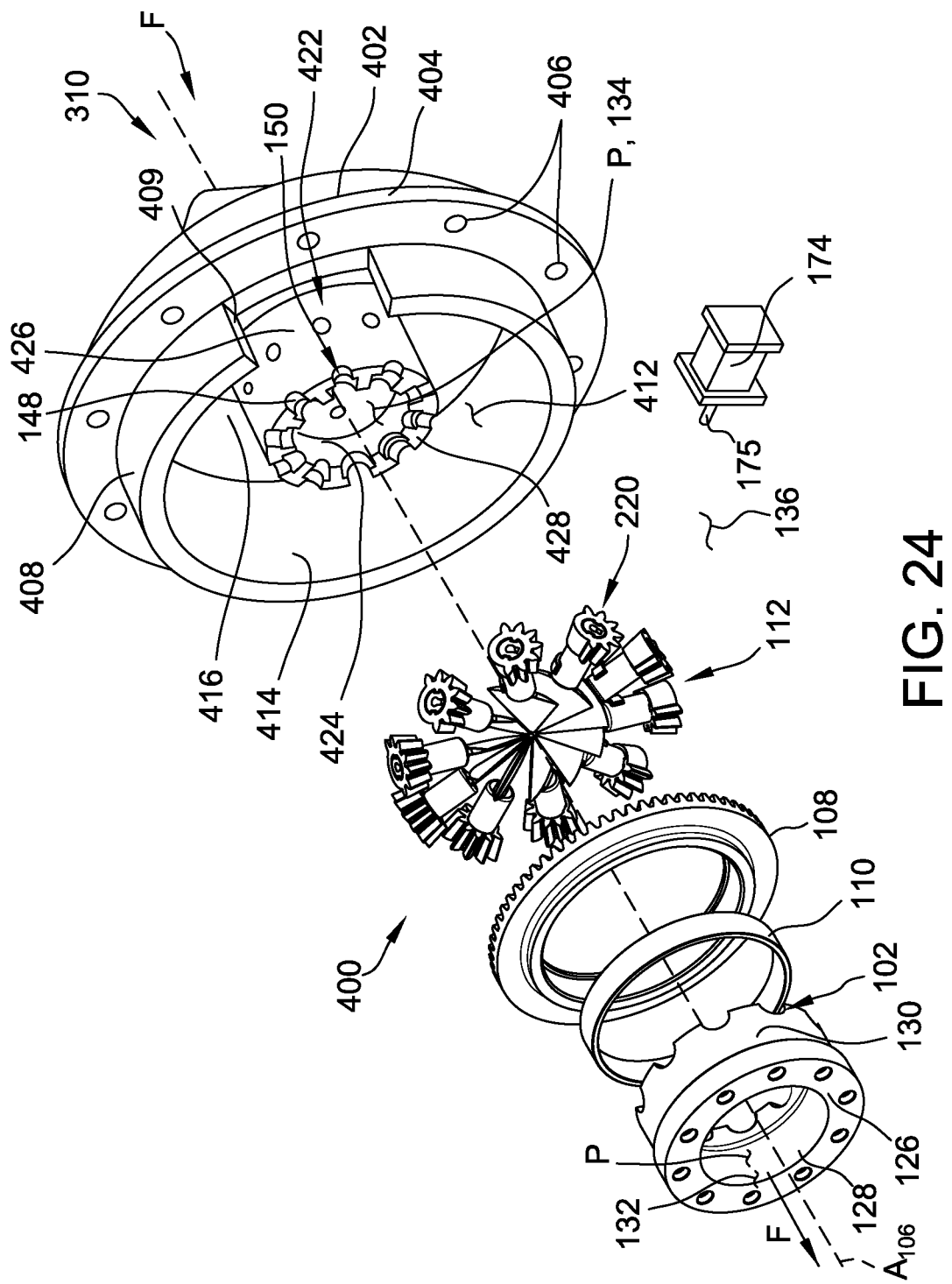
FIG. 24 is an exploded view of the example inlet guide vane apparatus combined with the end cap shown in FIG. 23.

Referring now to FIGS. 23 and 24, another example variable inlet guide vane apparatus 400 (also referred to herein as the inlet guide 400) is shown. FIG. 23 is an enlarged sectional view of a portion of the inlet guide 400 installed in the compressor 300, showing a similar portion indicated by the Section $C_{300}$ in FIG. 20 and shown in FIG. 21. In FIG. 23, the inlet guide 100 and the cap 340 (shown in FIG. 21) are substituted with the inlet guide 400 that is combined with an end cap 402. That is, the end cap 402 defines a portion of the inlet guide 400. FIG. 24 is an exploded view showing the inlet guide 400 that is combined the end cap 402. Elements and features of the inlet guide 400 that are similar to elements and features of the inlet guide 100 shown in FIGS. 1-22 and described above are identified in FIGS. 23 and 24 using the same references numerals as used in FIGS. 1-22. The end cap 402 has a similar configuration as the end cap 340 described above and shown in FIGS. 19-22 with additional features as described below.

The end cap 402 in this example is included with the compressor housing 302 (FIGS. 19 and 20) and the end cap 402 is connected to the main body 334 of the compressor housing 302 at the first end 336. The end cap 402 defines the first refrigerant inlet 310 of the compressor 300 to introduce refrigerant vapor into the first compression stage 324 (shown in FIG. 20). The end cap 402 includes an annular flange 404 that defines a radially outermost portion of the end cap 402. As shown in FIG. 23, the annular flange 404 is connected to the main body 334 of the compressor housing 302 at the first end 336. The annular flange 404 includes holes 406 formed therein that align with corresponding holes 345 formed in the main body 334 at the first end 336. The aligned holes 406 and corresponding holes 345 of the main body 334 receive fasteners 346 to connect the end cap 402 with the main body 334. The annular flange 404 extends radially outwardly from an annular sidewall 408 of the end cap 402. The annular sidewall 408 extends axially from a shoulder 410 of the end cap 402. An end of the annular sidewall 408 opposite the shoulder 410 is open. A recess 412 is defined by an interior surface 414 of the annular sidewall 408 and a recessed surface 416. The recessed surface 416 is defined by the shoulder 410. The shoulder 410 also defines an exterior surface 418 opposite the recessed surface 416. The end cap 402 also includes a neck portion 420 extending axially from the shoulder 410. The neck portion 420 has a smaller outer diameter than the annular sidewall 408. The shoulder 410 extends radially between and joins the neck portion 420 and the annular sidewall 408.

Directional terms such as "radially" and "axially" used to describe elements and features of the end cap 402 are used with reference to the driveshaft axis $A_{304}$ when the end cap 402 is installed in the compressor 300 and are used solely for ease of description. For example, the end cap 402 is not limited to a particular orientation.

The end cap 402 also includes an interior wall 422 extending axially within the recess 412 and outwardly from the recessed surface 416. The interior wall 422 is a portion of the inlet guide 400 that is defined by and made integral with the end cap 402. In particular, the interior wall 422 forms a second housing portion of the inlet guide 400 that is made integral with the end cap 402. The interior wall 422 is similar to the second housing portion 104 of the inlet guide 100 described above with particular reference to FIGS. 1-18, 21, and 22, and FIGS. 3-5. The interior wall 422 may be made integral with the end cap 402 by manufacturing techniques including, but not limited to including, casting, molding, powder metal manufacturing, additive manufacturing or 3D printing, and machining (e.g., computer numerical control machining). The end cap 402 and the interior wall 422 may be made from any suitable material including, for example, cast iron, aluminum, steel, and alloys thereof, as well as plastic, and any combination of these materials. The end cap 402 and the interior wall 422 may also be made from graphite or another suitable self-lubricating material that may be added to a casting or molding, for example. Making the end cap 402 and the interior wall 422 from a self-lubricating material may negate the need for a bearing 110 to facilitate rotation of the ring gear 108 relative to the interior wall 422 and/or the first housing portion 102.

In this description of the end cap 402 and the inlet guide 400, elements and features of the interior wall 422 that are similar to the elements and features of the second housing portion 104 of the inlet guide 100 are identified in FIGS. 23 and 24 using the same reference numerals as used in FIGS. 1-18, 21, and 22. The interior wall 422 being made integral with the end cap 402 negates the need for flanges for connecting the interior wall 422 with the end cap 402 (e.g., the interior wall 422 does not include the flanges 144, which are included with the second housing portion 104 of the inlet guide 100).

The end cap 402 also includes a central bore 430 that is defined by the neck portion 420 and the interior wall 422. The housing axis $A_{106}$ extends through the central bore 430. The central bore 430 extends axially through the cap 402 and defines the first refrigerant inlet 310 of the compressor 300 and a boundary of a fluid flow passageway P of the inlet guide 400. That is, the central bore 430 defines a continuous passage between the first refrigerant inlet 310 and an inlet 134 of the fluid flow passageway P. The fluid flow passageway P of the inlet guide 400 is similar to the fluid flow passageway P described above for the inlet guide 100. The interior wall 422 surrounds a portion of the fluid flow passageway P, and defines the inlet 134 of the fluid flow passageway P. As shown in FIG. 23, the central bore 430 is generally conical in shape and a diameter defined by the central bore 430 decreases in a direction from the refrigerant inlet 310 towards the inlet 134 of the inlet guide 400 along the axis $A_{106}$. In other embodiments, the central bore 430 may be generally cylindrical in shape and defines a generally constant diameter.

Like the inlet guide 100 described above, the inlet guide 400 is mounted in proximity to the refrigerant inlet 310 of the compressor 300. The fluid flow F enters the inlet guide 400 via the inlet 134, flows through the fluid flow passageway P, and exits the inlet guide 400 with a pre-swirl, as described above. The fluid flow F then enters into first compression stage 324 (shown in FIG. 20), and the fluid flow F contacts the first stage impeller 306 of the compressor 300 with a suitable direction. Alternatively, and/or additionally, the inlet guide vane 400 is mounted in proximity to the inlet for each stage of a multi-stage compressor. The inlet guide 400 includes the first housing portion 102, similar to the inlet guide 100.

When the inlet guide 400 is assembled, the interior wall 422 is connected to the first housing portion 102. The end cap 402, and thus the interior wall 422, is positioned axially upstream from the first housing portion 102 relative to the direction of fluid flow F. The interior wall 422 and the first housing portion 102 directly connect to form a vane housing assembly. Thus, the first housing portion 102 is directly connected to the end cap 402. The vane housing assembly is similar to the vane housing assembly 106 of the inlet guide 100 and has the housing axis $A_{106}$.

Directional terms such as "radially" and "axially" used to describe elements and features of the inlet guide 400 are used with reference to the housing axis $A_{106}$ and are used solely for ease of description. The inlet guide 400 is not limited to a particular orientation.

In addition to the first housing portion 102 and the interior wall 422, the inlet guide 400 includes the ring gear 108 and the guide vanes 112, like the inlet guide 100. The ring gear 108 includes the same features and elements as described above for the inlet guide 100, with particular reference to FIGS. 1-3 and 14-16. The ring gear 108 is rotatably connected to the first housing portion 102 and/or to the interior wall 422 and may be rotatably connected by the bearing 110 as described above for the inlet guide 100. The guide vanes 112 includes the same features and elements (e.g., each guide vane 112 has the vane 160, the stem 162, and the vane gear 164) as described above for the inlet guide 100, with particular reference to FIGS. 1-3, 7-10, and 18. Each guide vane 112 is rotatable relative to the vane housing assembly of the inlet guide 400 and is operably connected to the ring gear 108 such that rotation of the ring gear 108 causes each of the guide vanes 112 to rotate in unison. Each of the guide vanes 112 is rotatable relative to the vane housing assembly of the inlet guide 400 such that the orientation of the respective vane 160 within a fluid flow passageway P, defined by the first housing portion 102 and the interior wall 422, is selectively adjustable. In some embodiments, the guide vanes 112 are rotatable relative to the vane housing assembly of the inlet guide 400 in unison. The inlet guide 400 may also include one or more motors 174 operably connected to one or more of the guide vanes 112 to selectively rotate the guide vanes 112, as described above for the inlet guide 100.

The first housing portion 102 includes the first annular wall 126 having the first inner surface 128 and the first outer surface 130, as described above for the inlet guide 100. The interior wall 422, like the second annular wall 120 of the second housing portion 104, has a second inner surface 424 and a second outer surface 426. The first inner surface 128 and the second inner surface 424 define the boundary of the fluid flow passageway P extending through the vane housing assembly generally parallel to the housing axis $A_{106}$. The first housing portion 102 defines the exit or outlet 132 of the fluid flow passageway P, and the interior wall 422 defines the inlet 134 of the fluid flow passageway P. The fluid flow F enters the vane housing assembly of the inlet guide 400 at the inlet 134, passes through the fluid flow passageway P, and leaves the vane housing assembly of the inlet guide 400 at the outlet 132. The fluid flow F flows through the fluid flow passageway P in a direction that is generally parallel to the housing axis $A_{106}$. As described above, fluid flow F leaving the exit 132 has a pre-swirl imparted by the guide vanes 112 that are included in the inlet guide 400, similar to the inlet guide 100.

The vane housing assembly of the inlet guide 400 includes the exterior area 136 surrounding the first outer surface 130 and the second outer surface 426 and located generally radially outward from the vane housing assembly. In the illustrated embodiment, at least a portion of each of the guide vanes 112 is disposed between the first housing portion 102 and interior wall 422, and at least a portion of the guide vane 112 and the ring gear 108 is arranged in the exterior area 136 of the vane housing assembly of the inlet guide 400. Accordingly, the ring gear 108 and at least a portion of the guide vane 112 are accessible (e.g., to an operator or technician) for inspection and/or repairs without requiring inlet guide 400 to be disassembled. By way of example, an operator or technician can access the ring gear 108 and a portion of the guide vanes 112 (e.g., vane gears 164, described above) without first disconnecting the first housing portion 102 from the end cap 402. As shown in FIG. 24, the annular sidewall 408 includes a cut out 409 formed in the sidewall 408. The cut out 409 renders the sidewall 408 discontinuous along a circumferential extent and provides clearance to enable access to the ring gear 108 and a portion of the guide vanes 112 (e.g., vane gears 164). The cut out

409 may additionally, and/or alternatively, provide clearance for connecting the one or more motors 174 to one or more of the guide vanes 112.

The interior wall 422 includes a downstream surface 428 that has a similar configuration as the downstream surface 140 of the second annular wall 120 as described above for the second housing portion 104, with particular reference to FIGS. 4-6. Elements and features of the downstream surface 428 that are similar to the elements and features of the downstream surface 140 of the second annular wall 120 are identified in FIGS. 23 and 24 and described below using the same reference numerals as used in FIGS. 4-6.

The interior wall 422 does not include an upstream surface, unlike the second annular wall 120 that includes the upstream surface 142, because the interior wall 422 is made integral with the end cap 402. The downstream surface 428 in this example is generally annular in shape. The interior wall may have a width extending between the second outer surface 426 and the second inner surface 424 that is similar to the width W 120 of the second annular wall 120 (FIG. 5). The interior wall 422 may have a height extending between the downstream surface 428 and the recessed surface 416 that is similar to the height $H_{120}$ of the second annular wall 120 (FIG. 6). The second inner surface 424 includes a diameter that is similar to the diameter $D_{120}$ defined by the second inner surface 122 of the second annular wall (FIG. 5). The portion of the fluid flow passageway P surrounded by the interior wall 422 has a length that corresponds to the height of the interior wall 422. The dimensions of the interior wall 422, e.g., width, height, diameter, and length, may be scaled to the size of the compressor 300 and the aerodynamic needs of the compressor.

The downstream surface 428 includes the second channel surfaces 148 that are described above for the downstream surface 140 of the second annular wall 120. Each of the second channel surfaces 148 defines the corresponding second channel 150 and the second channel surfaces 148 are arranged in a radially symmetric pattern about the housing axis $A_{106}$. The downstream surface 428 may include the same number second channel surfaces 148 (e.g., ten second channel surfaces 148 defining ten second channels 150) as the downstream surface 140. Each of the second channel surfaces 148 may be identical, having the same size and shape, and the second channel surfaces 148 are in the shape of a segment of a cylindrical surface. Accordingly, the second channels 150 are generally in the shape of a half-cylinder. The second channel surfaces 148 have the same second channel length $L_{148}$, as described above and shown in FIG. 5, the length extending from the second inner surface 424 to the second outer surface 426 in this example. The second channel surfaces 148 and second channels 150 may extend through the entire width of the interior wall 422 or may only partially extend through the width of the interior wall 422. The second channel surfaces 148 are sized and shaped such that second channels 150 are sized and shaped to receive at least a portion of the guide vanes 112 therein, as described above. Each second channel surface 148 includes the secondary channel surface 152 defining the slot 154. The secondary channel surface 152 extends radially from the second channel surface 148, such that the slot 154 has the depth $D_{152}$ extending from the second channel surface 148 (shown in FIG. 4). The secondary channel surface 152 defining the slot 154 includes the first end 156 and the second end 158, and the secondary channel length $L_{152}$ extending therebetween (shown in FIG. 5). The secondary channel surface 152 further defines a slot width $W_{152}$ (shown in FIG. 5).

The guide vanes 112 are arranged in a radially symmetric pattern mirroring the radially symmetric pattern of the second channel surfaces 148 on the interior wall 422. The number of guide vanes 112 corresponds to the number of the second channel surfaces. In the example inlet guide 400, there are ten guide vanes 112 corresponding to the ten second channel surfaces 148. The inlet guide 400 may include any suitable number of guide vanes 112 that enables the inlet guide 400 to function as described herein. For example, the inlet guide 400 may include six guide vanes 112 corresponding to six second channel surfaces 148.

The first housing portion 102 and the interior wall 422 cooperatively define the guide vane passages $P_{160}$ (shown in FIG. 18). Each vane passage $P_{160}$ is a portion of the fluid flow passageway P. The vane passages $P_{160}$ are spaced circumferentially about the fluid flow passageway P. Each of the vanes 160 may cover one of the vane passages $P_{160}$. The vanes 160 are any shape or size enabling the inlet guide 400 to function as describe herein. Additionally, the shape and size of the vanes 160 may be selected based upon the intended application of the inlet guide 400. For example, the size, shape, and angle of the vanes 160 may be selected based on the type and configuration of the compressor 300, the operating conditions, and/or the fluid type used with the compressor. Each of the guide vanes 112 is rotatable relative to the vane housing assembly of the inlet guide 400 such that the orientation of the vane 160 within the fluid flow passageway P is selectively adjustable.

Each of the guide vanes 112 of the inlet guide 400 has the same elements and features as described above for the guide vanes 112 of the inlet guide 100 with particular reference to FIGS. 7-10. Each guide vane 112 includes the stem 162, the stop 177 extending circumferentially about the stem 162 and radially outward in a direction generally perpendicular to the stem axis $A_{162}$, the vane gear 164, and the alignment feature 191. The vane gear 164 may be removably connected to the stem 162 or may be made integral with the stem. The stop 177 limits rotation of the guide vane 112 about the stem axis $A_{162}$ when the stop 177 engages with a stop surface of at least one of the first housing portion 102 or the interior wall 422. The vane gear 164 is arranged to engage with the ring gear 108, while the stop 177 is captured within the slot 154. The alignment feature 191 receives a portion of the driveshaft of a motor, such as driveshaft 175 of motor 174, enabling the guide vane 112 to be operably connected to the motor. Alternatively, and/or additionally, the alignment feature 191 may be sized and shaped to receive an alignment tool (not shown) to facilitate alignment and mounting of the guide vanes 112 to the vane housing assembly of the inlet guide 400.

The first housing portion 102 of the inlet guide 400 has the same elements and features as described above for the inlet guide 100 with particular reference to FIGS. 11-13. In particular, the first housing portion 102 includes the first annular wall 126 that includes the downstream surface 192 and the upstream surface 194. The first annular wall 126 has the width $W_{126}$ extending between the first outer surface 130 and the first inner surface 128 and the height $H_{122}$ extending between the downstream surface 192 and the upstream surface 194. The first inner surface 128 defines the boundary of the first fluid flow passageway $P_{122}$ having the diameter $D_{122}$ defined by the first inner surface 128 and the length $L_{122}$ corresponding to the height $H_{122}$ of the first annular wall 126. The housing axis $A_{106}$ extends through the first fluid flow passageway $P_{122}$. When the first housing portion 102 and the interior wall 422 are connected, creating the vane housing assembly of the inlet guide 400, the first inner surface 128 and the second inner surface 424 define the boundary of the fluid flow passageway P with the housing axis $A_{106}$ extending therethrough.

As described above with reference to FIG. 12, the upstream surface 194 of the first housing portion 102 includes the first channel surfaces 196. The first channel surfaces 196 define the first channels 198 arranged in a radially symmetric pattern, about the housing axis $A_{106}$, that mirrors the radially symmetric pattern of the second channel surfaces 148 and the radially symmetric pattern of the guide vanes 112. The stop 177 of each guide vane 112 limits rotation of the respective guide vane 112 about the stem axis $A_{162}$ when the stop 177 engages one or more stop surfaces 195 of the first housing portion 102 as described above. Similar to the second housing portion 104 described above for the inlet guide 100, interior wall 422 may include one or more of the stop surfaces 195 that similarly interact with the stop 177 to limit rotation of a respective guide vane 112.

The first housing portion 102 and the interior wall 422 may be connected in any suitable manner that enables the inlet guide 400 to function as described herein. For example, and as described above for connecting the first housing portion 102 with the second housing portion 104 in the inlet guide 100, the first housing portion 102 is connected to the interior wall 422 by screws or other suitable fasteners.

When the first housing portion 102 is connected to the interior wall 422, each of the second channels 150 of the interior wall 422 are aligned with each of the first channels 198 of the first housing portion 102, such that the first and second channels 198 and 150 cooperatively form guide vane openings extending radially through the vane housing assembly of the inlet guide 400. The guide vane openings defined by the first housing portion 102 and the interior wall 422 are similar to the guide vane openings 200 described above and shown in FIG. 2. The boundary of the guide vane openings of the inlet guide 400 is defined by the first channel surface 196 of the first housing portion 102 and the second channel surface 148 of the interior wall 422. Each guide vane opening 200 is generally cylindrical and is sized and shaped to receive at least a portion of the stem 162 of one of the guide vanes 112 therein. The stem 162 of each guide vane 112 is rotatable relative to the first channel surface 196 and second channel surface 148 such that each guide vane 112 rotates within one of the guide vane openings of the inlet guide 400 about its respective stem axis $A_{162}$. The first channel surface 196 and the second channel surface 148 may include a plain bearing to facilitate rotation of the stem 162 relative to the first channel surface 196 and the second channel surface 148.

Additionally, and/or alternatively, the stem 162 and the first channel surface 196 and second channel surface 148 may include suitable bearings enabling the inlet guide 400 to function as described herein. Additionally, and/or alternatively, the stem 162 and/or the first channel surface 196 and the second channel surface 148 may be impregnated with Teflon or other suitable lubricants. The inlet guide vane 400 may be used with an oil free compressor.

When the stem 162 of each guide vane 112 is arranged within one of the guide vane openings of the inlet guide 400, the vane gears 164 are arranged in the exterior area 136 surrounding the first housing portion 102 and the interior wall 422, and each of the vanes 160 is arranged within the fluid flow passageway P. Accordingly, each of the vane gears 164 are accessible to an operator for inspection and/or repair without needing to disconnect or disassemble the first housing portion 102 and the interior wall 422. In embodiments in which the vane gear 164 is removably connected to the stem 162, the vane gear 164 may be readily replaced with another vane gear. For example, an operator may replace a worn or damaged vane gear 164 by disconnecting the vane gear 164 from the stem 162 and connecting a new or repaired vane gear 164 to the stem 162.

The ring gear 108 of the inlet guide 400 has the same elements and features as described above for the ring gear 108 of inlet guide 100 with particular reference to FIGS. 14-16. The ring gear 108 is rotatably connected to and rotatable relative to the first housing portion 102 and/or the interior wall 422. The ring second surface 208 of the ring gear 108 includes the gear teeth 218 that are sized and shaped to mate with the gear teeth 186 of each of the vane gears 164 of the guide vanes 112. Rotation of the ring gear 108, about the housing axis $A_{106}$, is transmitted to the vane gears 164, causing rotation of the guide vanes 112 about the vane axis $A_{162}$, within the guide vane openings of the inlet guide 400. The ring gear 108 further includes a feature 222 disposed on the inner surface 212. The feature 222 engages with the bearing 110, preventing the bearing 110 from translating axially relative to the ring gear 108. The ring gear 108, and the vane gears 164, are arranged in the exterior area 136 of the inlet guide 400 enabling an operator to inspect and/or repair the ring gear 108 without disconnecting the first housing portion 102 and interior wall 422. At least one of the guide vanes 112 may be a drive guide vane 220 that is operably connected to motor 174 that drives rotation of the drive guide vane 220. Rotation of the drive guide vane 220 causes rotation of the ring gear 108, which transmits rotation to the rest of the guide vanes 112, referred to as follower guide vanes. Accordingly, all the guide vanes 112 rotate in unison. The motor 174 may be a stepper motor. The motor may communicatively be connected to a controller (not shown) and the controller transmits one or more instructions to the motor causing the motor to rotate the drive guide vane 220 in order to arrange the guide vanes 112 in a selected orientation relative to the fluid flow F.

The inlet guide 400 may include the bearing 110 which has the same elements and features as described above for the bearing 110 of inlet guide 100 with reference to FIG. 17. The bearing 110 may be arranged between the first outer surface 130 of the first housing portion 102 and the ring inner surface 212 of the ring gear 108. The bearing 110 facilitates rotation of the ring gear 108 about the first housing portion 102. In some embodiments, the bearing 110 is connected to the ring gear 108, e.g., the bearing 110 is press fit into frictional engagement with the ring inner surface 212. Accordingly, the ring gear 108 and the bearing 110 rotate relative to the first housing portion 102. Alternatively, the bearing 110 may be press fit onto first housing portion 102 such that the bearing 110 and the first housing portion 102 are frictionally engaged and the ring gear 108 rotates relative to the bearing 110 and the first housing portion 102. The bearing 110 may be a non-lubricating bearing or a self-lubricating bearing, and the bearing 110 may include any suitable type of bearing 110 that enables the inlet guide 100 to function as described herein. The bearing 110 may also be omitted and the ring gear 108 may rotate about the first housing portion 102, without the use of a bearing. For example, the first housing portion 102 and/or the interior wall 422 may be made from a self-lubricating material (e.g., graphite) that may negate the need for a bearing 110.

The arrangement of the guide vanes 112 within the second channels 150 of the interior wall 422 of the inlet guide 400 is similar to the arrangement depicted in FIG. 18 for the inlet guide 100. As described above, simultaneous rotation of the guide vanes 112 changes the orientations of the vanes 160 relative to fluid flow F entering the inlet 134. The guide vanes 112 may be rotated, in unison, to arrange the inlet guide 400 to any suitable position, for example, to a fully open or neutral position, relative to the fluid flow F, based on the operational needs of the compressor 300. For example, the position of the vanes 160 may be selected to increase the operating range of the compressor, including both surge and choke.

Embodiments of the inlet guide vane apparatus described require relatively simple and efficient assembly of fewer components. Embodiments of the inlet guide vane apparatus, described above, include a first and second housing portion, a ring gear and bearing, and guide vanes. In the illustrated embodiments, the vane gear of the inlet guide vane and the ring gear are both arranged in an area exterior to the vane housing. Accordingly, these components are accessible to an operator to perform and inspection and/or a repair operation. Specifically, the operator does not need to disassemble the inlet guide vane apparatus to inspect and/or replace the gears of the guide vanes. In one embodiment, the vane gear is selectively connected to the stem of the guide vane. Accordingly, the vane gear may be removed and replaced, without requiring the operator to disassemble the housing minimizing exposure of bearing surfaces to contaminants. Embodiments of the bearing may be a non-lubricating bearing or is a self-lubricating bearing and thus the bearing does not require application of lubricants for operation. The embodiments described require fewer components, e.g., two parts "split-housing" that allows the operator to quickly (e.g., within 10 minutes) disassemble and/or reassemble the inlet guide vane apparatus. Furthermore, an operator may only need to use a single tool to disassemble and/or reassemble the inlet guide vane.

Embodiments of the inlet guide vane apparatus that are combined (e.g., partially made integral with) with components of the compressor may facilitate additional advantages. In particular, the second housing portion may be made integral with an end cap of the compressor as an axially extending interior wall of the end cap. The interior wall of the end cap defines the inlet of the fluid flow passageway of the inlet guide. The interior wall is directly connected to the guide vanes and the first housing portion of the inlet guide. Making the second housing portion of the inlet guide integral with the end cap reduces the number of components used to assemble the inlet guide. Reducing the number of components facilitates improving geometric dimensioning and tolerancing as stack-up is reduced. Additionally, fewer components required to assemble the inlet guide facilitates reducing alignment errors between the components. Quicker assembly and disassembly of the inlet guide may also be facilitated.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any orientation of the item described.

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, those functions and elements may be combined in other ways according to the present disclosure to accomplish the same or different objectives. Acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only and are not intended to be limiting.

What is claimed is:

1. An inlet guide vane apparatus for use in combination with a compressor housing, the inlet guide vane apparatus configured to impart a pre-swirl motion to a fluid flow entering an inlet of the compressor housing, the apparatus comprising:
   a compressor end cap comprising an annular sidewall defining a recess, an annular flange extending radially outward from the annular sidewall and connectable with a main body of the compressor housing, and an interior wall extending axially within the recess, wherein the end cap defines the inlet of the compressor housing, wherein the annular sidewall is at least partially disposed within the main body of the compressor housing when the annular flange is connected to the main body such that the annular sidewall and the main body include an overlapped region;
   a housing portion connected to the interior wall of the end cap, wherein the housing portion and the interior wall cooperatively define a fluid flow passageway and guide vane openings extending into the fluid flow passageway, wherein the connection between the interior wall and the housing portion is axially aligned with the overlapped region when the annular flange is connected to the main body;
   a ring gear rotatable relative to at least one of the housing portion and the end cap; and
   guide vanes connected to the housing portion and the end cap, each guide vane of the guide vanes extending through one of the guide vane openings, each guide vane comprising:
      a vane gear operably connectable with the ring gear and disposed at an exterior of the housing portion; and
      a vane disposed within the fluid flow passageway, wherein each of the guide vanes is rotatable relative to the housing portion and the end cap such that an orientation of the vane within the fluid flow passageway is selectively adjustable.

2. The inlet guide vane apparatus of claim 1, wherein the ring gear and the vane gear are accessible from the exterior of the housing portion.

3. The inlet guide vane apparatus of claim 2, wherein the annular sidewall includes a cut out to enable access to the ring gear and the vane gear from the exterior of the housing portion.

4. The inlet guide vane apparatus of claim 1, wherein the housing portion defines first channels and the interior wall defines second channels, wherein each of the first channels is aligned with one of the second channels such that the first and second channels cooperatively define the guide vane openings.

5. The inlet guide vane apparatus of claim 1 further comprising a bearing, wherein the ring gear is rotatably connected to at least one of the housing portion and the end cap by the bearing.

6. The inlet guide vane apparatus of claim 5, wherein the bearing is a self-lubricating bearing.

7. The inlet guide vane apparatus of claim 1, wherein the guide vanes include a drive guide vane and follower guide vanes.

8. The inlet guide vane apparatus of claim 7, wherein the drive guide vane is operably connected to a motor operable to rotate the drive guide vane, wherein rotation of the drive guide vane drives rotation of the ring gear and rotation of the ring gear imparts rotation to the follower guide vanes.

9. The inlet guide vane apparatus of claim 8, wherein each guide vane includes a stop, and wherein the housing portion is defined by slots, each slot of the slots extending from a first stop surface to a second stop surface and being sized and shaped to receive one of the stops of one of the guide vanes therein.

10. The inlet guide vane apparatus of claim 9, wherein the motor is a stepper motor, and wherein contact between the stop and at least one of the first and second stop surfaces stops rotation of the guide vanes and stops the motor.

11. The inlet guide vane apparatus of claim 1, wherein the vane gear of each guide vane is removably connected to the guide vane.

12. The inlet guide vane apparatus of claim 1, wherein the end cap comprises a shoulder extending between the annular sidewall and the interior wall, and a neck extending axially from the shoulder opposite the interior wall, wherein the neck defines the inlet of the compressor housing.

13. A compressor comprising:
a compressor housing comprising a main body and an end cap, the end cap comprising an annular sidewall defining a recess, an annular flange extending radially outward from the annular sidewall and connected to an end of the main body, the annular sidewall is at least partially disposed within the main body when the annular flange is connected to the end of the main body, and an interior wall extending axially within the recess, the end cap defining an inlet of the compressor housing;
a driveshaft rotatably supported within the compressor housing;
an impeller connected to the driveshaft and operable to impart kinetic energy to a fluid flow entering the inlet upon rotation of the driveshaft;
an inlet guide vane apparatus combined with the end cap of the compressor housing, the inlet guide vane apparatus comprising:
a housing portion connected to and positioned axially downstream from the interior wall of the end cap, wherein the interior wall and the housing portion cooperatively define a fluid flow passageway and guide vane openings extending into the fluid flow passageway, wherein the connection between the interior wall and the housing portion is disposed within the main body when the annular flange is connected to the main body when the annular flange is connected to the main body;
a ring gear rotatable relative to at least one of the housing portion and the end cap, wherein the ring gear is at least partially disposed within the main body of the compressor when the annular flange is connected to the main body; and
guide vanes connected to the housing portion and the end cap, each guide vane of the guide vanes extending through one of the guide vane openings, each guide vane comprising:
a vane gear operably connected to the ring gear and disposed at an exterior of the housing portion, wherein the vane gears are at least partially disposed within the main body of the compressor when the annular flange is connected to the main body; and
a vane disposed within the fluid flow passageway, wherein each of the guide vanes is rotatable relative to the housing portion such that an orientation of the vane within the fluid flow passageway is selectively adjustable.

14. The compressor of claim 13, wherein the housing portion defines first channels and the interior wall defines second channels, wherein each of the first channels is aligned with one of the second channels such that the first and second channels cooperatively define the guide vane openings.

15. The compressor of claim 13, further comprising a bearing, wherein the ring gear is rotatably connected to at least one of the housing portion and the end cap by the bearing.

16. The compressor of claim 13, wherein the guide vanes include a drive guide vane and follower guide vanes.

17. The compressor of claim 16, wherein the drive guide vane is operably connected to a motor operable to rotate the drive guide vane, wherein rotation of the drive guide vane drives rotation of the ring gear and rotation of the ring gear imparts rotation to the follower guide vanes.

18. The compressor of claim 17, wherein each guide vane includes a stop, and wherein the housing portion is defined by slots, each slot of the slots extending from a first stop surface to a second stop surface and being sized and shaped to receive one of the stops of one of the guide vanes therein.

19. A method of assembling a compressor that includes a compressor housing having a main body and an end cap connected to an end of the main body, and an inlet guide vane apparatus combined with the end cap, the apparatus including a housing portion and guide vanes, wherein each guide vane of the guide vanes includes a vane gear and a vane, the method comprising:
assembling the inlet guide vane apparatus by:
rotatably connecting a ring gear to one of the housing portion and the end cap;
connecting the housing portion to an interior wall of the end cap such that the housing portion and the interior wall cooperatively define a fluid flow passageway and guide vane openings extending into the fluid flow passageway;
positioning the guide vanes relative to the other one of the housing portion and the end cap such that, when the housing portion and the end cap are connected, each guide vane extends through one of the guide vane openings and the vane of each vane gear is disposed in the fluid flow passageway; and
operably connecting the vane gear of each guide vane to the ring gear;

positioning at least a portion of the inlet guide vane apparatus within the main body of the compressor housing;

connecting an annular flange of the end cap to an end of the main body, wherein the annular flange extends radially outward from an annular sidewall that is at least partially disposed within the main body of the compressor when the annular flange is connected to the end of the main body, the annular sidewall defining a recess, the interior wall extending within the recess, and wherein the end cap defines an inlet of the compressor housing that is fluidly connected with the fluid flow passageway, wherein at least a portion of the guide vanes and the connection between the housing and the end cap are disposed within the main body of the compressor when the annular flange is connected to the main body;

removing the vane gear from one of the guide vanes without disconnecting the end cap and the housing portion; and connecting a second vane gear to the one of the guide vanes.

\* \* \* \* \*